(12) United States Patent
Talarico et al.

(10) Patent No.: US 12,389,379 B2
(45) Date of Patent: Aug. 12, 2025

(54) TIME-DOMAIN RESOURCE ALLOCATION FOR CONFIGURED GRANT TRANSMISSIONS IN NEW RADIO SYSTEMS

(71) Applicant: Apple Inc., Cupertino, CA (US)

(72) Inventors: Salvatore Talarico, Sunnyvale, CA (US); Yongjun Kwak, Gyeonggi-do (KR); Jose Armando Oviedo, Santa Cruz, CA (US); Yingyang Li, Beijing (CN)

(73) Assignee: Apple Inc., Cupertino, CA (US)

( * ) Notice: Subject to any disclaimer, the term of this patent is extended or adjusted under 35 U.S.C. 154(b) by 371 days.

(21) Appl. No.: 17/598,140

(22) PCT Filed: Jul. 2, 2020

(86) PCT No.: PCT/US2020/040676
§ 371 (c)(1),
(2) Date: Sep. 24, 2021

(87) PCT Pub. No.: WO2021/003373
PCT Pub. Date: Jan. 7, 2021

(65) Prior Publication Data
US 2022/0191864 A1    Jun. 16, 2022

Related U.S. Application Data

(60) Provisional application No. 62/870,263, filed on Jul. 3, 2019.

(51) Int. Cl.
*H04W 72/0446* (2023.01)
*H04W 72/23* (2023.01)

(52) U.S. Cl.
CPC ....... *H04W 72/0446* (2013.01); *H04W 72/23* (2023.01)

(58) Field of Classification Search
None
See application file for complete search history.

(56) References Cited

U.S. PATENT DOCUMENTS

| | | | |
|---|---|---|---|
| 2018/0234992 A1* | 8/2018 | Shi | ........ H04W 72/23 |
| 2019/0149365 A1 | 5/2019 | Chatterjee et al. | |
| 2019/0182807 A1 | 6/2019 | Panteleev et al. | |
| 2020/0314842 A1* | 10/2020 | Bhattad | ........ H04L 1/188 |
| 2020/0359409 A1* | 11/2020 | Karaki | ........ H04W 72/1268 |
| 2020/0404655 A1* | 12/2020 | Salem | ........ H04W 72/23 |

(Continued)

OTHER PUBLICATIONS

Configured grant enhancement, Ericsson, 3GPP TSG-RAN WG1 Meeting R1-1907457, May 2019, 12 pages.

(Continued)

*Primary Examiner* — Hassan A Phillips
*Assistant Examiner* — Gautam Sharma
(74) *Attorney, Agent, or Firm* — Kilpatrick Townsend & Stockton LLP

(57) ABSTRACT

The present application relates to wireless devices and components including apparatus, systems, and methods for time-domain resource allocation for configured grant transmissions in New Radio (NR) systems operating on unlicensed spectrum. In some embodiments, a user equipment may be configured with periodicity, bitmap information, duration information, or slot-offset information to facilitate the time-domain resource allocation.

15 Claims, 18 Drawing Sheets

(56) References Cited

U.S. PATENT DOCUMENTS

2020/0413424 A1* 12/2020 Fakoorian ............. H04W 76/36
2022/0159687 A1*  5/2022 Myung ................. H04W 72/21
2022/0353711 A1* 11/2022 Ying .................... H04L 5/0053

OTHER PUBLICATIONS

Discussion on the enhancements to configured grants, Vivo, 3GPP TSG RAN WG1 R1-1906133, May 2019, 10 pages.
Transmission with configured grant in NR unlicensed band, Huawei HiSilicon, 3GPP TSG RAN WGl Meeting R1-1906047, May 2019, 22 pages.
International Patent Application No. PCT/US2020/040676, International Search Report and Written Opinion, Mailed on Oct. 9, 2020, 15 pages.
3rd Generation Partnership Project; Technical Specification Group Radio Access Network; Study on NR-based access to unlicensed spectrum (Release 16), 3GPP TR 38.889 V16.0.0, Dec. 2018, 119 pages.
China Patent Application No. 202080045340.X, Office Action, Jun. 22, 2024, 19 pages.

* cited by examiner

1300 

```
┌─────────────────────────────────┐
│ Generating or processing configuration │
│ messages that indicate CG periodicity and │
│             bitmap              │
│              1304               │
└─────────────────────────────────┘
                 │
                 ▼
┌─────────────────────────────────┐
│   Decoding or encoding a CG uplink    │
│ transmission based on the CG periodicity │
│           and bitmap            │
│              1308               │
└─────────────────────────────────┘
```

Figure 13

1400 
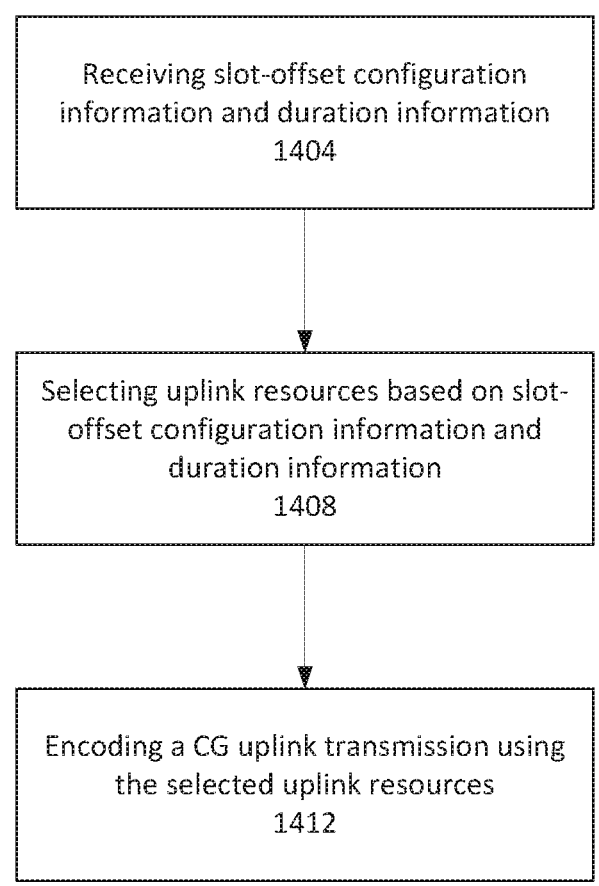
Figure 14

TIME-DOMAIN RESOURCE ALLOCATION FOR CONFIGURED GRANT TRANSMISSIONS IN NEW RADIO SYSTEMS

RELATED APPLICATIONS

The present application is a 371 U.S. National Phase of PCT International Patent Application No. PCT/US2020/040676, filed Jul. 2, 2020, which claims priority to U.S. Provisional Patent Application No. 62/870,263, filed Jul. 3, 2019, and entitled NR TIME-DOMAIN RESOURCE ALLOCATION FOR CONFIGURED GRANT TRANSMISSIONS IN NR SYSTEMS OPERATING ON UNLICENSED SPECTRUM. The disclosure of said applications are hereby incorporated by reference in their entireties.

FIELD

The present application relates to wireless communication systems including apparatuses, systems, and methods for time-domain resource allocation for configured grant transmissions in New Radio (NR) systems.

BACKGROUND

Each year, the number of mobile devices connected to wireless networks significantly increases. In order to keep up with the demand in mobile data traffic, changes have to be made to system requirements to be able to meet these demands. Three areas that may be enhanced in order to deliver this increase in traffic are larger bandwidth, lower latency, and higher data rates.

One of the limiting factors in wireless innovation is the availability in spectrum. To mitigate this, the unlicensed spectrum has been an area of interest to expand the availability of long term evolution (LTE). In this context, one major enhancement for LTE in third generation partnership project (3GPP) Release 13 has been to enable its operation in the unlicensed spectrum via licensed assisted access (LAA), which expands the system bandwidth by utilizing a flexible carrier aggregation (CA) framework introduced by the LTE-Advanced system.

BRIEF DESCRIPTION OF DRAWINGS

A better understanding of the present subject matter can be obtained when the following detailed description of various embodiments is considered in conjunction with the following drawings.

FIG. 13 illustrates an operation flow/algorithmic structure in accordance with some embodiments.

FIG. 14 illustrates an operation flow/algorithmic structure in accordance with some embodiments.

Figure 1:
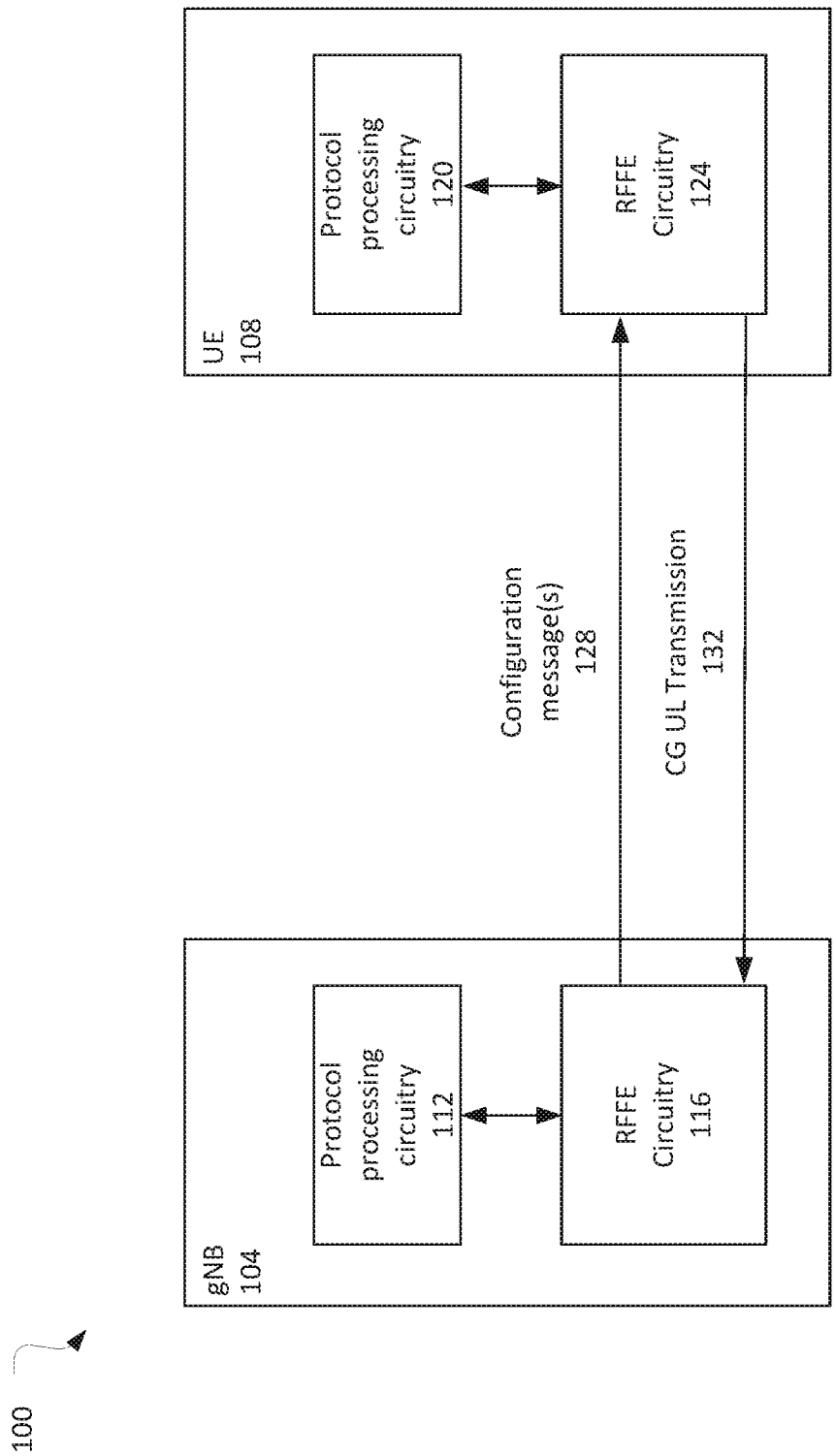
FIG. 1 illustrates network devices in accordance with some embodiments.

While the features described herein may be susceptible to various modifications and alternative forms, specific embodiments thereof am shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B).

The following is a glossary of terms that may be used in this disclosure:

The term "circuitry" as used herein refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate army (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the circuitry may execute one of more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, and/or transferring digital data. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes. The terms "application circuitry" and/or "baseband circuitry" may be considered synonymous to, and may be referred to as, "processor circuitry."

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, and/or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "network element" as used herein refers to physical or virtualized equipment and/or infrastructure used to provide wired or wireless communication network services. The term "network element" may be considered synonymous to and/or referred to as a networked computer, networking hardware, network equipment, network node, router, switch, hub, bridge, radio network controller, RAN device, RAN node, gateway, server, virtualized VNF, NFVI, and/or the like.

The term "computer system" as used herein refers to any type interconnected electronic devices, computer devices, or components thereof. Additionally, the term "computes system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources.

The term "appliance," "computer appliance," or the like, as used herein refers to a computer device or computer system with program code (e.g., software or firmware) that is specifically designed to provide a specific computing resource. A "virtual appliance" is a virtual machine image to be implemented by a hypervisor-equipped device that virtualizes or emulates a computer appliance or otherwise is dedicated to provide a specific computing resource.

The term "resource" as used herein refers to a physical or virtual device, a physical or virtual component within a computing environment, and/or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, and/or the like. A "hardware resource" may refer to compute, storage, and/or network resources provided by physical hardware element(s). A "virtualized resource" may refer to compute, storage, and/or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable.

The term "channel" as used herein refers to my transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link." "carrier," "radiofrequency carrier," and/or any other like term denoting a pathway or medium through which data is communicated. Additionally, the term "link" as used herein refers to a connection between two devices through a RAT for the purpose of transmitting and receiving information.

The terms "instantiate," "instantiation," and the like as used herein refers to the creation of an instance. An "instance" also refers to a concrete occurrence of an object, which may occur, for example, during execution of program code.

The terms "coupled," "communicatively coupled," along with derivatives thereof are used herein. The term "coupled" may mean two or more elements am in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or ink, and/or the like.

The term "information element" refers to a structural element containing one or more fields. The term "field" refers to individual contents of an information element, or a data element that contains content.

3GPP Fifth Generation (5G) New Radio (NR) systems may improve LTE and LTE-A operation on an unlicensed spectrum. Objectives with respect to utilizing shared/unlicensed spectrum in 5G NR may include both physical layer aspects, which is handled by radio access network (RAN)

working group 1 (WG1), and physical layer procedures, which is handled by RAN WG1 and RAN working group 2 (WG2).

The physical layer aspects may include a frame structure that includes single and multiple downlink (DL)-to-uplink (UL) and UL-to-DL switching points within a shared channel occupancy time (COT) with associated identified listen-before-talk (LBT) requirements. See, for example, Technical Report (TR) 38.889, v16.0.0 (2018 Dec. 19), Section 7.2.1.3.1. The physical layer aspects may also include: an UL data channel that includes extension of a physical uplink shared channel (PUSCH) to support physical resource block (PRB)-based frequency block interlaced transmission; support of multiple PUSCH(s) starting positions in one or multiple slot(s) depending on an LBT outcome with an understanding that an ending position may be indicated by an UL grant; a design not requiring a user equipment (UE) to change a granted transport block size (TBS) for a PUSCH transmission depending on an LBT outcome. Various PUSCH enhancements based on cyclic prefix orthogonal frequency division multiplexing (CP-OFDM) may also be considered. Applicability of sub-PRB frequency block-interlaced transmission for 60 kilohertz (kHz) may be decided by RAN WG1.

Physical layer procedures may include, for load-based equipment (LBE), a channel access mechanism in line with agreements from NR unlicensed spectrum (NR-U) study item (see, for example, TR 38.889, section 7.2.1.3.1). Physical layer procedures may also include hybrid automatic repeat request (HARQ) operation concepts. For example, NR HARQ feedback mechanisms may be baseline for NR-U operation with extensions in-line with agreements during a study phase (see, for example, TR 38.889, section 7.2.1.3.3) including immediate transmission of HARQ acknowledgment/negative acknowledgment (A/N) for corresponding data in a same shared COT as well as transmission of HARQ A/N in a subsequent COT. Support mechanisms to provide multiple, supplemental time, and/or frequency domain transmission opportunities may be possible. Physical layer procedures may further include aspects related to scheduling multiple transmission time intervals (TTIs) for PUSCH in-line with agreements from a study phase (see, for example, TR 38.889, section 7.2.1.3.3). Physical layer procedures may further include aspects related to configured grant operation. For example, NR Type-1 and Type-2 configured grant mechanisms may be the baseline for NR-U operation with modifications in line with agreements during a study phase (see, for example, TR 38.889, section 7.2.1.3.4). Still further, physical layer procedures may include data multiplexing aspects (for both UL and DL) considering LBT and channel access priorities.

One of the challenges of operating devices in unlicensed spectrum is to ensure a fair coexistence with other incumbent technologies, in order to do so, depending on a particular band in which devices operate, some restrictions might be taken into account when designing NR-U systems. For instance, if operating in a 5 gigahertz (GHz) band, a device may perform an LBT procedure to acquire the medium before a transmission can occur.

One of the fundamental configurations for configured grants in NR-U may be the configuration of time-domain resources allowed for this feature. If this type of configuration is performed through radio resource control (RRC) signaling, due to the periodic values that the configured grant can assume, the RRC might have a variable length that tunes with a value of the periodicity or be a multiple integer of the periodicity itself. Furthermore, a Release 15 time-domain allocation, which may be considered as a baseline for time-domain allocation for CG operation in NR-U, may only provide one uplink PUSCH transmission during each periodicity. However, the Rel-15 allocation approach may not allow the UE to access a channel very efficiently given the LBT procedure of NR-U as the UE may fail to access the channel in its single slot opportunity during the periodicity.

Therefore, embodiments of the present disclosure describe approaches that allow multiple channel access opportunities within a periodicity to improve efficiency of the channel utilization. Various options are described herein to opportunely configure time-domain resources for configured grant transmission in NR operating on unlicensed spectrum.

FIG. 1 illustrates devices of a radio access network (RAN) 100 in accordance with some embodiments. The RAN 100 may include a gNB 104 communicatively coupled with a UE 108 over an air interface. In some embodiments, at least a portion of the communications between the gNB 104 and the UE 108 may be performed in the unlicensed spectrum and, in these embodiments, the devices of the RAN 100 may said to operate as an NR-U system. The gNB 104 may include protocol processing circuitry 112 and radio-frequency front end (RFFE) circuitry 116. Similarly, the UE 108 may include protocol processing circuitry 120 and RFFE circuitry 124. In general, the protocol processing circuitries 112 and 120 may perform user and control plane operations at various layers of a protocol stack to enable wireless communication via the air interface, which are effectuated through the RFFE circuitries 116 and 124. The protocol operations may be compatible with those developed by the Third Generation Partnership Protocol (3GPP) for Fifth Generation (5G) and later systems. In some embodiments, the protocol operations may be performed at one or more of the following layers: layer 1 (L1 or physical (PHY) layer), media-access control (MAC) layer; and radio link control (RLC) layer. The protocol processing circuitries 112 and 120 may correspond to baseband circuitries 1610 and 1710 shown and described with respect to FIGS. 16 and 17. RFFE circuitries 116 and 124 may correspond to radio front end modules 1615 and 1715 shown and described with respect to FIGS. 16 and 17.

In operation, the gNB 104 may generate and send one or more configuration messages 128 to the UE 108. In various embodiments, the configuration messages 128 may be RRC signaling, downlink control information, system information block (SIB) messages, etc. Among other information, the configuration messages 128 may configure uplink and downlink resource allocations to the UE 108. The uplink resource allocations may be dynamic allocation or configured grant (CG) allocation.

The CG allocations may be sets of resources allocated to one or more UE that do not require a PDCCH transmission before every PUSCH transmission. In some embodiments, the gNB 104 may configure the UE 108 with a Type 1 CG allocation or a Type 2 CG allocation. Type 1 CG allocation may be fully configured and released using RRC signaling. Once configured, the UE may have a set of periodic opportunities for PUSCH transmission. The PDCCH may only be required when requesting a retransmission. With a Type 2 CG allocation, the resource allocation may be partially configured using RRC signaling, but may be subsequently activated or deactivated using PDCCH transmissions.

In some embodiments, the configuration messages 128 may configure the UE 108 with time-domain allocations using parameters similar to parameters used in the NR Release 15 CG design. These parameters include: periodicity of a CG; time-domain offset (for example, slot offset) of a resource; starting symbol and length indicator value (SLIV) used to deduce both a resource allocation starting symbol (S) and a number of consecutive symbols belonging to the resource allocation (L); and repK to indicate a number of transmissions of a transport block (TB) within a bundle of the configured uplink grant. However, some embodiments may enhance or replace the Release 15 time-domain allocation aspects to improve time-domain allocation for CG in NR-U. Enhancements described herein may include reinterpreting the Release 15 parameters so that they are more useful for the unlicensed operation, adding new parameters on top of the Release 15 parameters, or replacing/disabling some of the current parameters. In some embodiments, enhancing or replacing the Release 15 time-domain allocation may include the use of a bitmap. The bitmap may be designed to preserve the functions of the Release 15 time-domain allocation, while improving the efficiency of the ability of the UE 108 to use the time resources. Embodiments describe how this bitmap may be interpreted when the PUSCH repetition is larger or equal to the length of this bitmap. Another issue addressed by various embodiments is that if a bitmap of fixed length is defined for any desired CG periodicity of P units, the bitmap length of X units may have to be an integer multiple of P, for example, X may need to satisfy the formulae X mod P=0 when X>P, or vice-versa when X<P. This may imply that a choice of the fixed length bitmap of length X may need further enhancement in order to support an allocation of periodic time-domain resources of the supported Release 15 values of P.

Based on Release 15 NR, the configured grant periodicities allowed may be based on subcarrier spacing (SCS) as follows: 15 kHz SCS: 2, 7, n*14 symbols, where n={1, 2, 4, 5, 8, 10, 16, 20, 32, 40, 64, 80, 128, 160, 320, 640}; 30 kHz SCS: 2, 7, n*14 symbols, where n={1, 2, 4, 5, 8, 10, 16, 20, 32, 40, 64, 80, 128, 160, 256, 320, 640, 1280}; and 60 kHz SCS with normal CP: 2, 7, n*14 symbols, where n={1, 2, 4, 5, 8, 10, 16, 20, 32, 40, 64, 80, 128, 160, 256, 320, 512, 640, 1280, 2560}. Embodiments described herein may include those and other CG periodicities.

In some embodiments, the configuration messages 128 may include information to configure a bitmap to replaces the Release 15 time-domain allocation for CG in NR-U.

The configuration messages 128 may include RRC signaling to provide the UE 108 with a bitmap to configure the time-domain resources. The bitmap may be composed of X bits, where each bit corresponds to a symbol/slot/subframe or radio frame. As an example X=40, where each bit correspond to a slot. In embodiments, the value of X may be the same regardless of the SCS used. In embodiments, the value of X may be scaled based on SCS: for example, X=40 bits for 15 KHz SCS, X=80 bits for 30 KHz SCS, or X=160 bits for 60 KHz SCS.

In embodiments, X may be a constant and independent of SCS, and a granularity of signaled time resources may be indicated by a parameter G, where G can take on several granularities to accommodate different service/traffic types. For example, G∈{2 orthogonal frequency domain multiplexing (OFDM) symbols (OSs), 7 OSs, 1 slot, 2 slots, 4 slots}. In other embodiments, X may be a variable, and X and G can be independent of each other and of SCS, and configurable in the CG activation.

Figure 2:
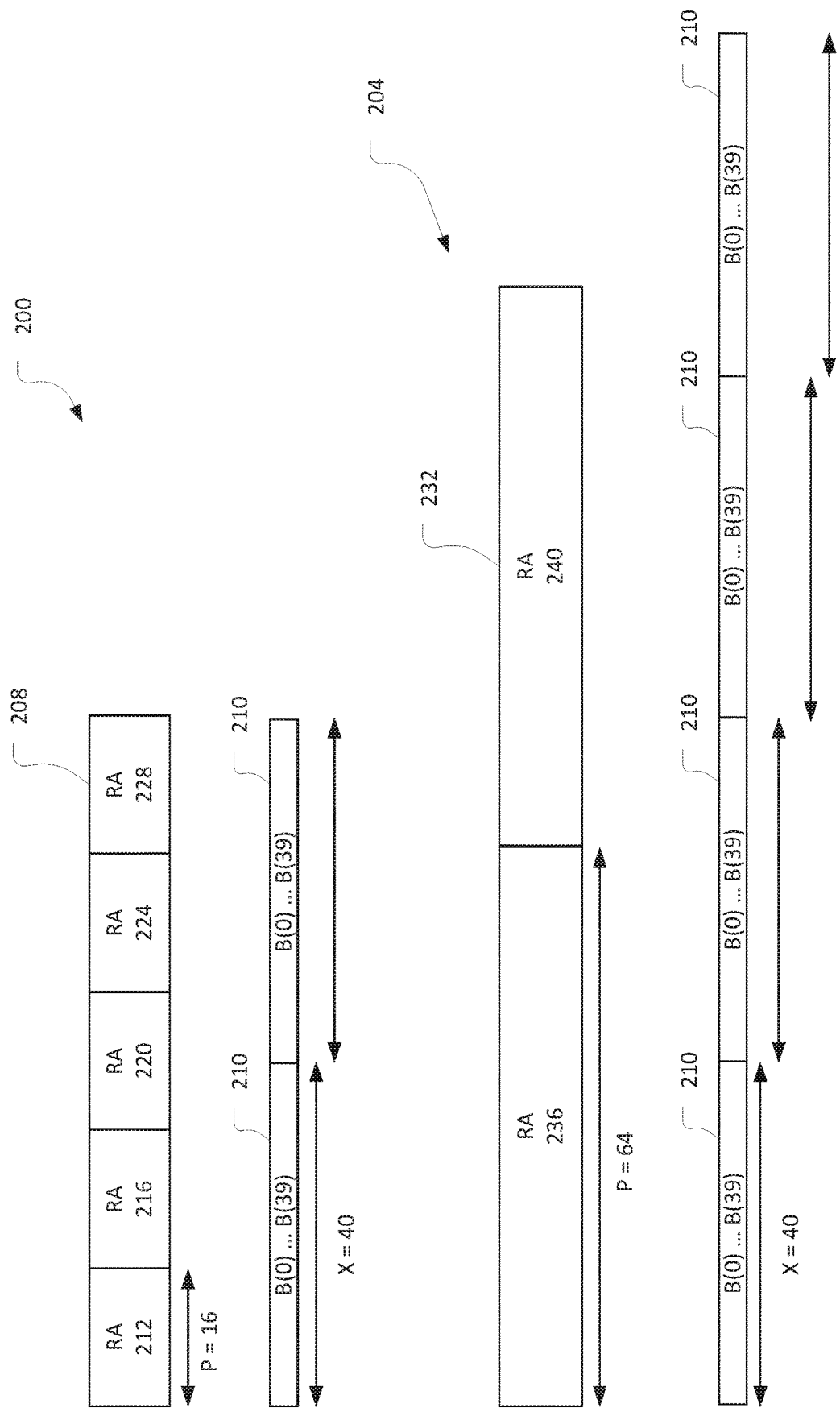
FIG. 2 illustrates a configured grant allocation in accordance with some embodiments.

FIG. 2 illustrates CG allocations 200 and 204 using a bitmap repeated over time independent of a CG periodicity in accordance with some embodiments.

CG allocation 200 includes CG uplink resources 208 having a CG periodicity (P) defined as 16 time resource units (for example, symbols) and a bitmap 210 having a size (X) of 40. The uplink resources 208 are shown with five resource allocation periods (RAPs), RAP 212, RAP 216, RAP 220, RAP 224, and RAP 228. Each of the RAPs may include 16 time resource units as defined by the CG periodicity.

The bitmap 210 may be repeated over time and all values (B(0)-B(39)) of the bitmap may be used to determine availability of the uplink resources 208 for CG transmission. For example, the first sixteen values (B(0)-B(15)) may be used to determine the availability of the sixteen time resource units of RAP 212; the next sixteen values (B(16)-B(31)) may be used to determine the availability of the sixteen time resource units of RAP 216; the last eight values (B(32)-B(39)) may be used to determine the availability of the first eight time resource units of the RAP 220; the first eight values (B(0)-B(7)) may be used to determine the availability of the last eight time resource units of the RAP 220; the next sixteen values (B(8)-B(23)) may be used to determine the availability of the sixteen time resource units of RAP 224; and the next sixteen values (B(24)-B(39)) may be used to determine the availability of the sixteen time resource units of RAP 228.

CG allocation 204 includes CG uplink resources 232 having a CG periodicity (P) defined as 64 time resource units (for example, symbols) and the same bitmap 210, having a size (X) of 40, may be used. The uplink resources 232 are shown with two RAPs, RAP 236 and RAP 240. Each of the RAPs may include 64 time resource units as defined by the CG periodicity.

The bitmap 210 may be repeated over time and all values (B(0)-B(39)) of the bitmap may be used to determine availability of the uplink resources 232 for CG transmission. For example, the forty values (B(0)-B(39)) may be used to determine the availability of the first forty time resource units of RAP 236; the first twenty four values (B(0)-B(23)) may be used to determine the availability of the next twenty four values of RAP 236: the next sixteen values (B(24)-B(39) may be used to determine the availability of the first sixteen time resource units of the RAP 232; the forty values (B(0)-B(39) may be used to determine the availability of the next forty time resource units of the RAP 232; and the first eight values (B(0)-B(7)) may be used to determine the availability of the last eight time resource units of RAP 232.

Thus, as shown in FIG. 2, regardless of the CG periodicity used, the bitmap may wo be repeated and its value may be interpreted accordingly.

Figure 3:
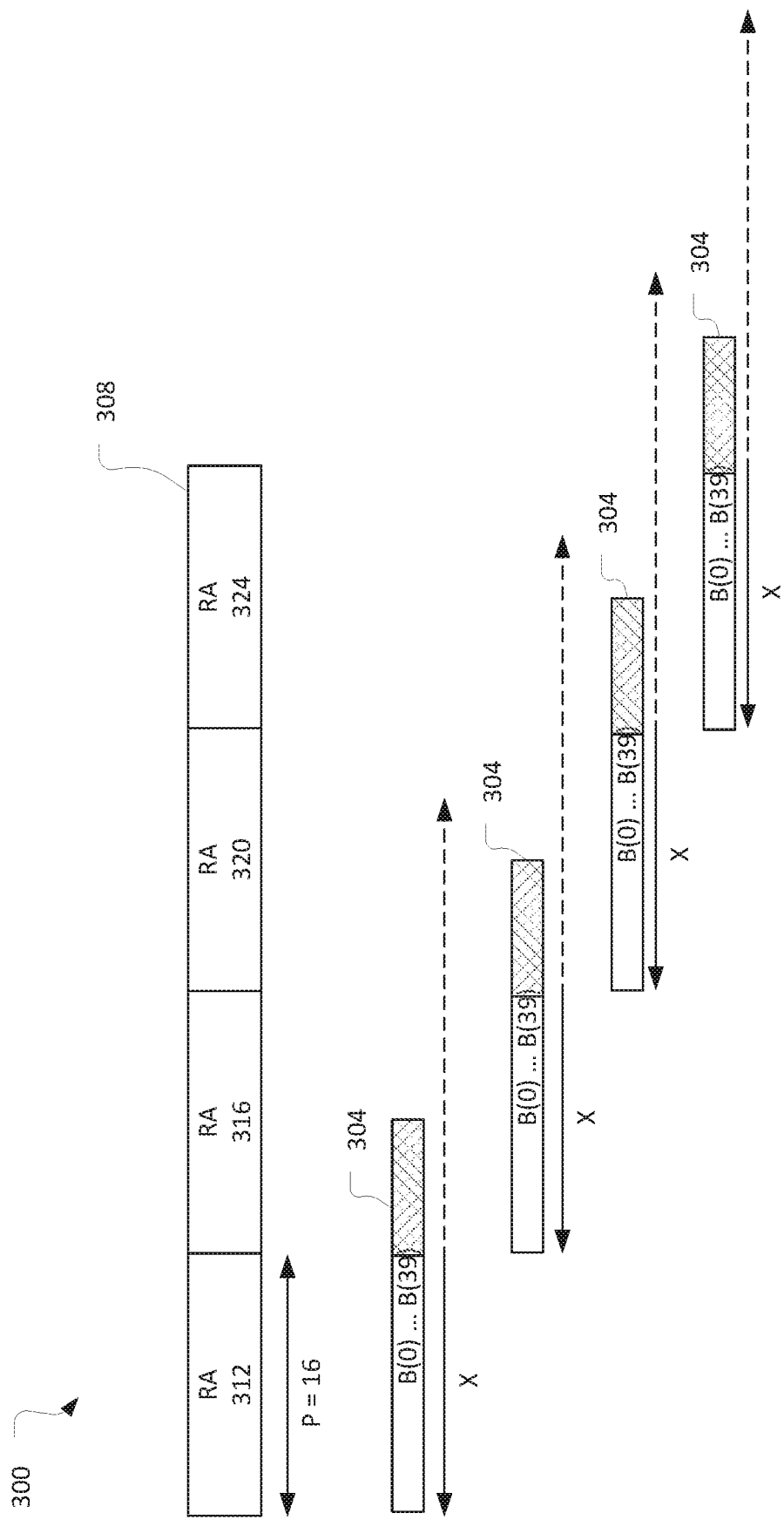
FIG. 3 illustrates a configured grant allocation in accordance with some embodiments.

FIG. 3 illustrates a CG allocation 300 in which only a portion of a bitmap 304 is used in accordance with some embodiments. The CG allocation 300 illustrates that, for each period, P time-domain resource elements may be configured based on the first P elements for the bitmap 304 of length X.

The CG allocation 300 may include CG uplink resources 308 having a CG periodicity (P) defined as 16 time resource units (for example, symbols) and the bitmap 304 may have a size (X) of 40. The uplink resources 308 are shown with four RAPs. RAP 312, RAP 316, RAP 320, and RAP 324. Each of the RAPs may include 16 time resource units.

As can be seen, the length in time resource units of each periodicity value (P) is smaller than the length (X) of the bitmap 304. Thus, in accordance with some embodiments, only the first P values of the bitmap 304 may be used. For example, the same first sixteen values (B(0)-B(15)) may be used to determine the availability of the sixteen resource units for all the RAPs 312, 316, 320, and 324.

Figure 4:
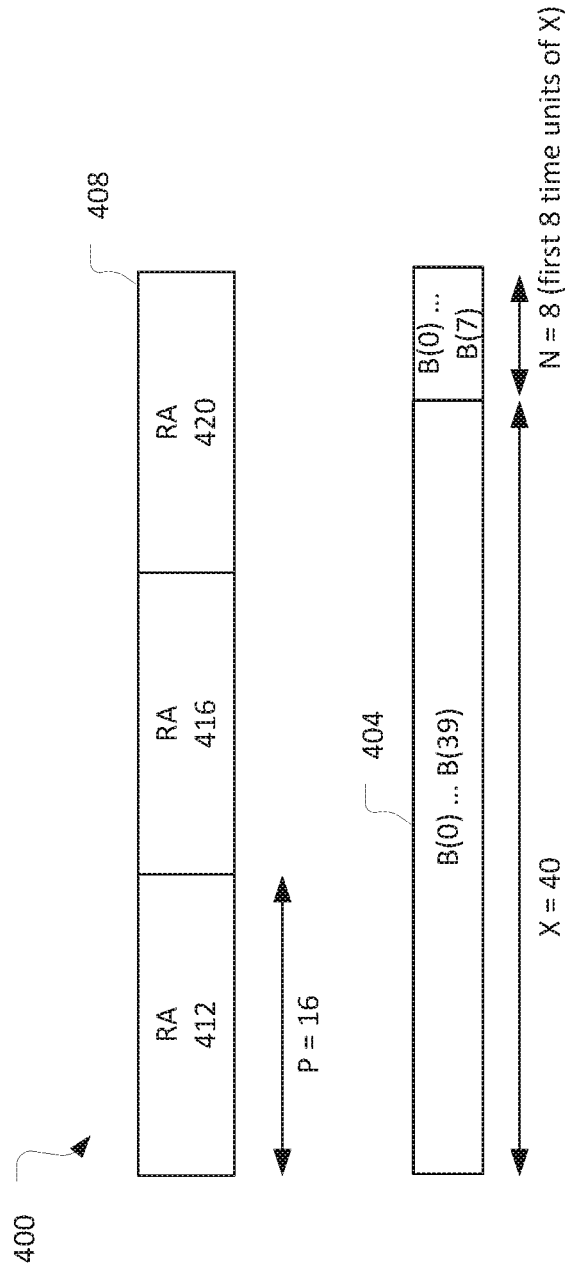
FIG. 4 illustrates a configured grant allocation in accordance with some embodiments.

In some embodiments, if a length in time resource units of each periodicity value is smaller than the corresponding length of the bitmap (X) using the same time resource units, for each group of time-domain resources that are covered by n periods, where a is such that n×P=X or (n×P>X and (n−1)×P<X), the bitmap (X) may be used, and the spare resources that are not covered by the length of the bitmap within the last period are configured using the first (nP−X) values of the bitmap. This concept is shown in FIG. 4, which illustrates a CG allocation 400 in which a bitmap 404 is at least partially repeated in accordance with some embodiments.

The CG allocation 400 may include CG uplink resources 408 having a CG periodicity (P) defined as 16 time resource units (for example, symbols) and the bitmap 404 may have a size (X) of 40. The uplink resources 408 are shown with three RAPs, RAP 412, RAP 416, and RAP 420. Each of the RAPs may include 16 time resource units.

The CG allocation 400 illustrates that, for each group of n periods, the resource allocation follows X. If resource units are not covered by the bitmap 404 of a last period of each group, then the first (nP−X) time resource units of the bitmap 404 may be used (where n=3). So, for example, the first sixteen values (B(0)-B(15)) may be used to determine the availability of the sixteen resource units of RAP 412; the next sixteen values (B(16)-B(31)) may be used to determine the availability of the sixteen resource units of RAP 416; the last eight values (B(32)-B(39)) may be used to determine the availability of the first eight resource units of RAP 420; and the first eight values (B(0)-B(7)) may be used to determine the availability of the last eight resource units of the RAP 420.

In accordance with some embodiments, when P<X and X mod P≠0 in general, the bitmap of length X may be designed with resource allocation such that the allocation pattern repeats every P time resources, regardless of the bitmap length. However, if the periodic allocation will occur N total times such that NP>X, let n be a maximum integer such that X−nP>0. Also, suppose that M is the minimum integer such that NP<MX, then the bitmap may be applied M consecutive times. After the first X bits, the second application of the bitmap may then be applied with a circularly shifted to the left by L slots, where L=X−nP. Similarly, the m$^{th}$ bitmap may be circularly shifted by (m−1)L mod P/Q slots, for m=1, ..., M.

In embodiments, the greatest common factor between P and X can be used to educe the indication information of the circular shift. Let the greatest common factor between P and X be Q. Then the circular shift can be indicated in multiples of Q slots. The second X bits will have the bitmap applied with a circular shift to the left by L multiples of Q slots, where LQ=X−nP. Then, for the m$^{th}$ bitmap application, the bitmap may be circularly shifted by (m−1)L mod P/Q slots, for n=1, ..., M.

Figure 5:
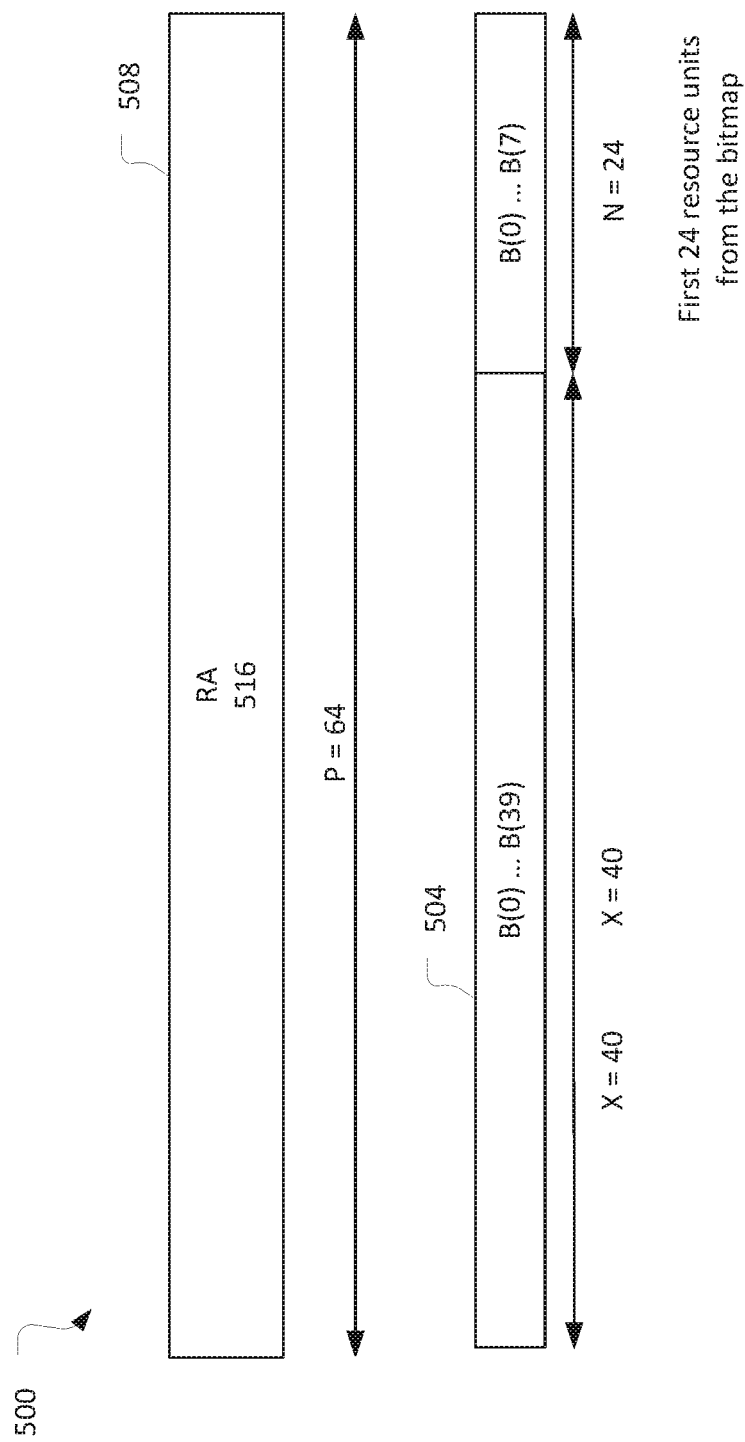
FIG. 5 illustrates a configured grant allocation in accordance with some embodiments.

FIG. 5 illustrates a CG allocation 500 in which a bitmap 504 is at least partially repeated in accordance with some embodiments.

The CG allocation 500 may include CG uplink resources 508 having a CG periodicity (P) defined as 64 time resource units (for example, symbols) and the bitmap 504 may have a size (X) of 40. The uplink resources 508 are shown with one RAP 516 that includes 64 time resource units.

The CG allocation 500 illustrates an embodiment in which if the length in time resource units of each period (for example, 64 as shown) is larger than the corresponding length X (for example, 40 as shown) of the bitmap 504 using the same time resource units, the first time-domain resources for each period may be configured as indicated by the bitmap 504, while the remaining resource units of the period may be configured by repeating, in time, the bitmap 504 up to the end of the period. So, for example, the forty values (B(0)-B(39)) may be used to determine the availability of the first forty resource units of RAP 516; the first twenty four values (B(0)-B(23)) may then be used to determine the availability of the last twenty four resource units of RAP 516. The process may be repeated for subsequent RAs, for example, the next RAP may start again with the first values of the bitmap 504.

In some embodiments, if the length in time resource units of each period value is larger than the corresponding length of the bitmap X using the same time resource units, the first X resource units within a period may be configured following the bitmap, while the remaining resources within a period may not be used for configured grant transmission.

In some embodiments, bitmap X and the repetition Y can be configured, where X resource units are repeated by Y times for allocating configured grant resource in the beginning of a period, while the remaining resources within the period may not be used for configured grant transmission.

Figure 6:
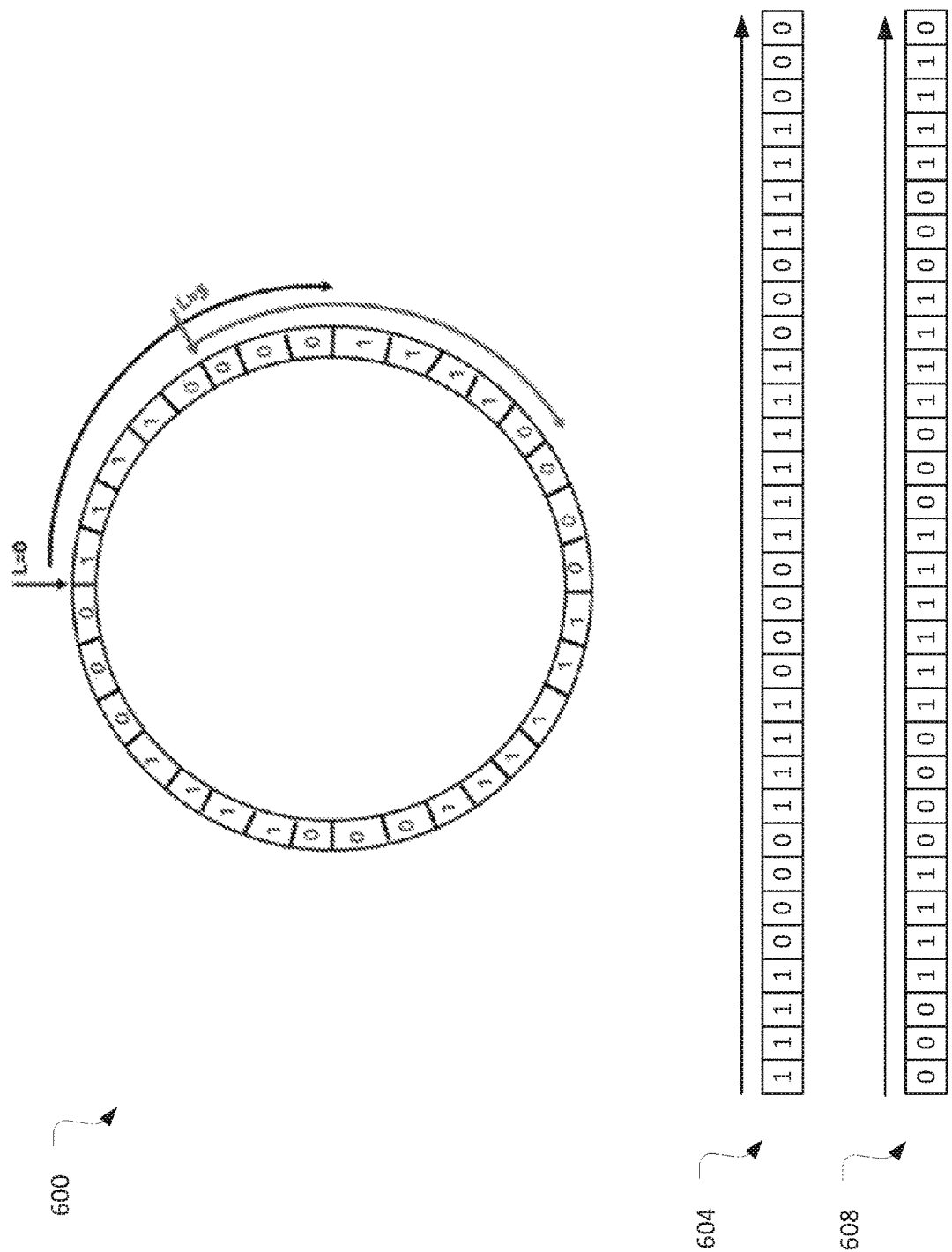
FIG. 6 illustrates a circular array that may be used to generate one or more bitmaps in accordance with some embodiments.

FIG. 6 illustrates circular array 600 that may be used to generate one or more bitmaps in accordance with some embodiments. In some embodiments, the circular array 600 may be used to generate different iterations or repetitions of a bitmap using cyclic shifts with different offsets, L. This may increase flexibility in configuring the time domain resources when a bitmap is smaller than the period (for example, P>X).

In some embodiments, for each repetition/iteration, the bitmap may be reinterpreted and the X bits may be cyclically shifted by a value equal to the offset, L. Notice that this operation is similar to shifting an array circularly as follows: Y=circshift(B,L), where B is the original m bitmap, L is the offset, and Y is the circularly shifted version of B.

So, for example, the circular array 600 with an offset of zero, for example, L=0, would provide a bitmap 604. Bitmap 604 may be referred to as the base bitmap. The circular array 600 may be used to generate bitmap 608 using an offset of 5. Bitmap 608 may be referred to as a circularly-shifted bitmap.

Figure 7:
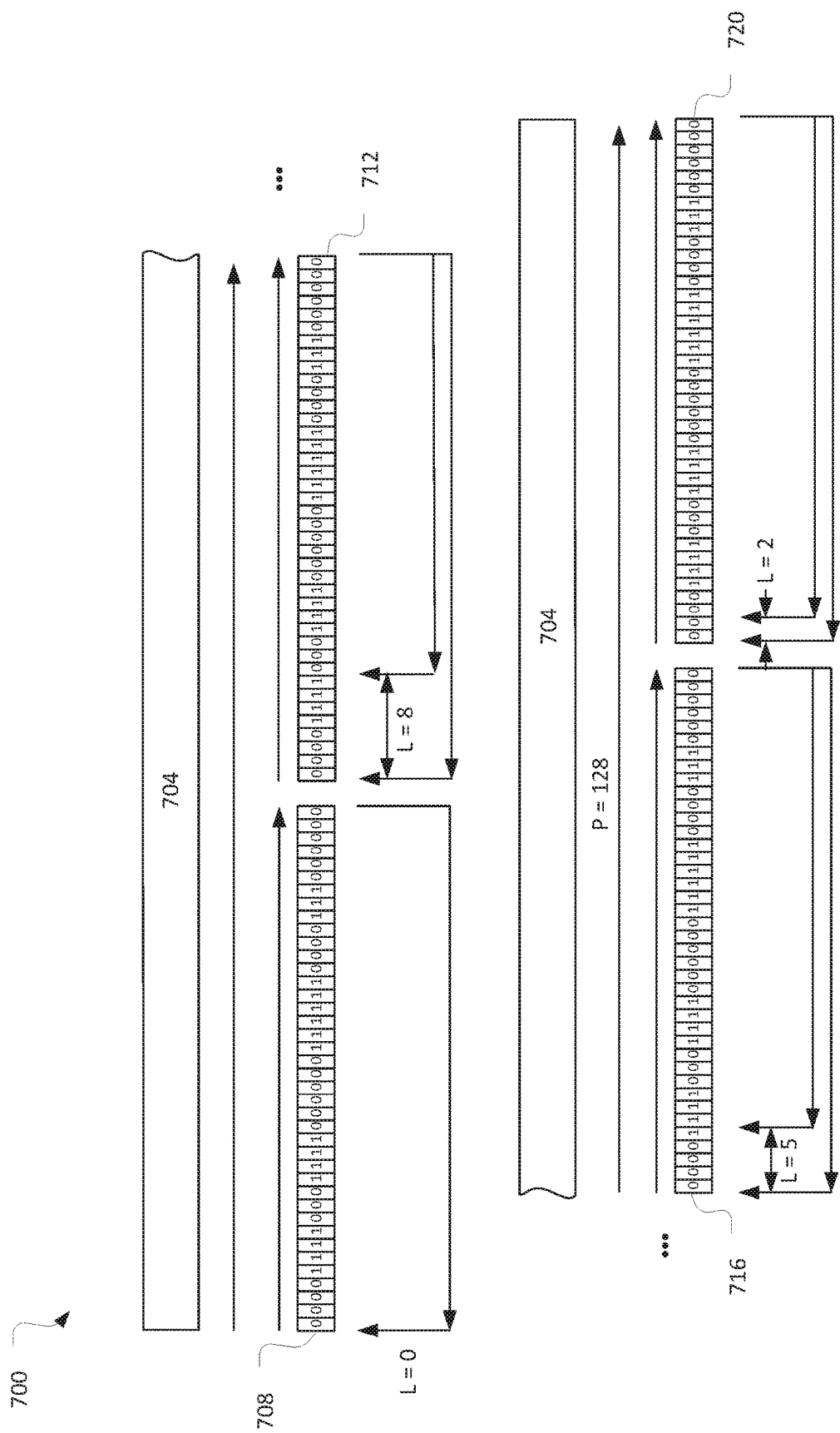
FIG. 7 illustrates an example of using a base bitmap and one or more circularly-shifted bitmaps in accordance with some embodiments.

FIG. 7 illustrates an example of using CG allocation 700 using a base bitmap and one or more circularly-shifted bitmaps in accordance with some embodiments. The CG allocation 700 shows one RAP 704 that includes a CG periodicity (P) of 128 time resource units. A base bitmap 708, having a length of 40 (for example, X=40) and an offset of zero (for example, L=0), may be used to determine the availability of the first forty resource units of RAP 704. A circularly-shifted bitmap 712, having a length of 40 and an offset of 8 (for example, L=8), may be used for the next forty resource units of RAP 704. With the offset of 8, the first value of bitmap 712 will correspond to the ninth value of the bitmap 708 while the last value of bitmap 712 will correspond to the eighth value of the bitmap 708. A circularly-shifted bitmap 716, having a length of 40 and an offset of 5 (for example, L=5), may be used for the next forty resource units of RAP 704. With the offset of 5, the first value of bitmap 716 will correspond to the sixth value of the bitmap 708 while the last value of bitmap 712 will correspond to the forth value of the bitmap 708. A circularly-shifted bitmap 716, having a length of 40 and an offset of 2 (for example, L=2), may be used for the last eight resource units of RAP 704. With the offset of 2, the first value of bitmap 716 will correspond to the third value of the bitmap 708.

While FIG. 7 illustrates the offset being different for each repetition/iteration of the bitmap, other embodiments may use the same offset for some or all of the repetitions/ iterations. For example, in some embodiments, L=0 for the first bitmap while a common offset is used for the following repetitions/iterations.

In various embodiments, one or more offset values may transmitted to the UE 108 through the configuration messages 128. The offset values may be transmitted with the bitmap by, for example, enhancing the bitmap from X to X+M bits, where M may be used to signal the offset and may be either the most significant bits or least significant bits of the bitmap. In one embodiment, 2 or 3 bits may be used to signal a common offset or each offset.

In other embodiments, the UE 108 can be configured with a table, such that each entry in the table contains a bitmap allocation configuration, which includes the bitmap, cyclic shifts, granularity, and any other parameter that helps to complete the allocation. The UE 108 can be assigned the index of the entry of the allocation, where the index is indicated in the RRC for CG type 1, or activation DC in CG type 2. In one embodiment, multiple bitmaps may be configured per UE based on the traffic/service, and it may be up to the UE to select one of them. In one embodiment, once the LE 108 has selected one among the available bitmaps, it may signal back to the 104 gNB the bitmap used. This may be done by providing an indication of the bitmap allocation index within CG uplink control information (CG-UCI).

Notice that the options provided above are not exclusive to one another, but multiple of them can be supported in various embodiments.

As briefly discussed above, parameters {periodicity, slot offset, SLIV, and repK} of the Release 15 time-domain allocation approach can be enhanced by either reinterpreting some of these parameters or enabling new parameters to make for a more efficient time-domain allocation for the CG in NR-U operation in accordance with some embodiments. To address the lack of continuous time-domain allocation and multiple enabled channel access opportunities within a periodicity when using the Release 15 allocation, embodiments may provide the UE 108 with access to the channel at multiple slot offsets. Furthermore, for each offset, the configuration may enable multiple contiguous slots, depending on the available resources and periodicity.

In some embodiments, the UE 108 may be configured with a plurality of slot offsets in the same manner similar to that used in the Release 15 allocation. There may be a maximum number of slot offsets N, and the UE 108 may be configured with n slot offsets $(K_{2,1}, \ldots, K_{2,n})$, $n=1, \ldots, N$, where $K_{2,i} \in \{0, \ldots, 5119\}$, $i=1, \ldots$ n. The value $K_{2,i}$ may not be greater than the periodicity P (P in units of slots). The duration of contiguous resources (for example, slots/mini-slots) configured per offset may be given by parameter z, where z<Z, where Z is the maximum allowable resource (for example, slot/mini-slot) transmission duration: for example Z≤8 to allow the maximum configurable TB repetitions or allow 8 TB transmissions. In one embodiment, if the configured offsets in the periodicity are n, each with resource (for example, slot/mini-slot) duration r, then nz<P, so that there may always be resource (for example, slot/mini-slot) gaps between transmissions within a periodicity. In one embodiment, n and z may be defined as new parameters, or can be accommodated by reinterpreting existing fields. In one embodiment, when the system operates on the unlicensed band, n or z can be signaled by reinterpreting one or more of the following parameters periodicity, slot offset, SLIV, and repK. When the system operates on a licensed band, then these parameters may be reinterpreted us in Release 15.

In embodiments, the UE 108 can be configured through the use of two sequences, essentially a sequence of pairs, which have the same length n: one of these sequences indicates n slot offsets $(K_{2,1}, \ldots, K_{2,n})$, $n=1, \ldots, N$, where $K_{2,i} \in \{0, \ldots, 5119\}$, $i=1, \ldots$, n, and the other sequence indicates the consecutive number of resources that are allocated for configured grant after the corresponding offset. In one embodiment, the number of resources can have a fixed granularity, or the granularity can be configured: for example the granularity can be G∈{2 OS, 7 OS, 1 slot, 2 slots, 4 slots}, in one embodiment, the indication of the offset and consecutive resources can be jointly indicated by providing direct indication of the set of resources that are configured for configured grant operation, without decoupling this information into a set of offset and consecutive resources.

In embodiments, the offsets $(K_{2,1}, \ldots, K_{2,n})$, $K_{2,i} \neq K_{2,j}$ if i≠j, are each configured such that they can indicate any slot offset within the periodicity, and indicate the slot offset with respect to the system frame number (SFN) when CG type 1 is used, and with respect to the activation DCI when using CG type 2. If the reference slot is slot m, then the UE 108 may perform the LBT operation at slots $m+K_{2,i}$, $i=1, \ldots$, n, which will occur in the first periodicity of the CG activation. The allocation may repeat every periodicity after that until the CG is deactivated, so the UE 108 may perform LBT to access the channel at slots $m+K_{2,i}+lP$, $l=1, \ldots, L$, where L is the number of periodicities until the CG is deactivated.

In embodiments, given the parameter z, which indicates the number of consecutive resources that are allocated for CG operation, whose value and granularity can be fixed or configured through RRC signaling, 5120−Z+1 sets of resources can be formed. In one embodiment, 13 bits of the DCI may be used to indicate a set from these sets of resources. In embodiments, multiple sets of resources can be used, and configured via a bitmap, which may be configured by RRC signaling, and indicates N elements of the set of resources. In one embodiment, given a bitmap that indicates a plurality of sets of resources, T bits may be used in the DCI to indicate how many of the configured sets of resources are utilized (first or last 2^T can be used). In one embodiment, the slot duration z only applies to the slot offset when the UE has successfully passed LBT in the configured slot offset occasion. In embodiments, the slot duration is applied to all slot offsets, such that the UE can perform LBT on all consecutive LBT occasions with the slot duration for each slot offset. In one embodiment, the UE may attempt LBT to access the channel for each slot offset, but only transmit in one slot offset per periodicity once LBT succeeds. In embodiments, the UE may use as many slot offsets as its traffic demands, regardless of periodicity.

In embodiments, the n slot offsets may be individually configured in a manner similar to that of the Release 15 signaling for the single slot offset. For CG type 1 the n slot offsets may be configured via RRC, and for CG type 2 the slot offsets may be configured via 13 bits each via the DCI, such that the slot offsets can take any value integer from 0 to 5119. In one embodiment, the candidate slot offset positions with a periodicity may be constrained to a smaller set of slots, such that the signaling required per each offset is reduced. The reduced set can be a function of the periodicity P, such that if maximum slot/mini-slot duration per offset is Z, then the slot offsets come from a total of M≤[5120/Z] total possible slot offsets.

Figure 8:
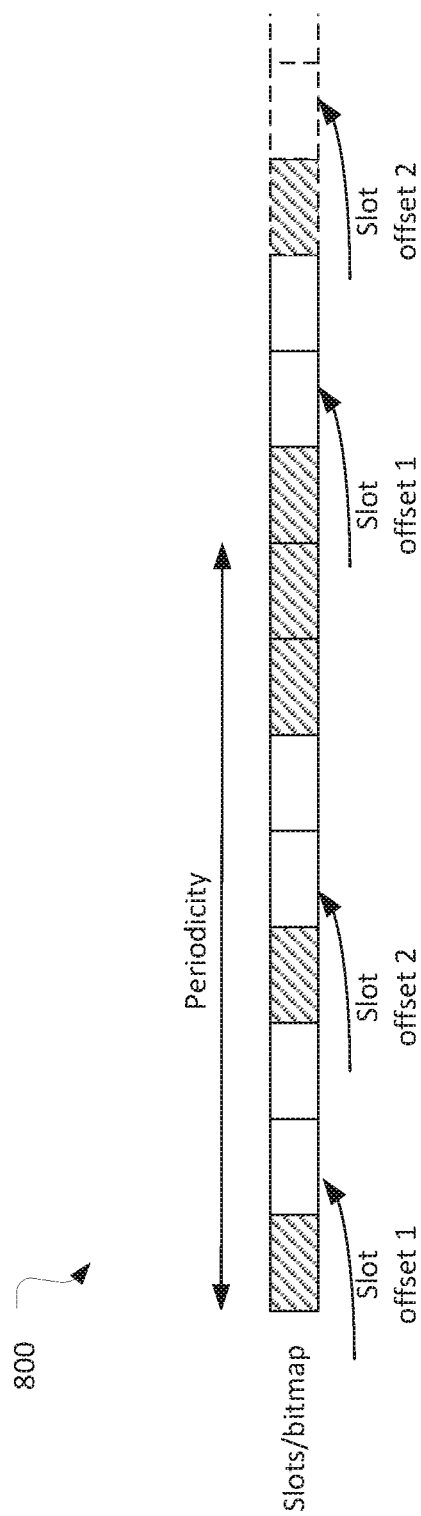
FIG. 8 illustrates a configured grant allocation in accordance with some embodiments.

FIG. 8 illustrates a CG allocation 800 in accordance with some embodiments. The CG allocation 800 may include a CG periodicity of eight slots and may include a plurality (for example, two) slot offsets configured within the CG periodicity. The resource allocation may include a length of two. Therefore, the UE 108 may perform its transmission contiguously over two slots after slot offset 1, for example, transmit in the second and third slots, or after slot offset 2, for example, transmit in the fifth and sixth slots. The slot offset locations can be completely flexibly signaled using the legacy Release 15 approach of an offset from 0 to 5119, or can come from a subset of the Release 15 set of offsets.

In some embodiments, given a reference starting slot m, z to indicate the number of consecutive resources to be used for CG operation, and a fixed offset value n, the resources within a period P may be configured so that m+n (1-l) {0, . . . , z-1} are used for configured grant transmission, where i=2, 3, . . . , K, and K is selected so that m+n (K-1)+z-1<P. In one embodiment, m, z, and n can be RRC configured or indicated through DCI by either adding new fields or reinterpreting the existing fields.

In embodiments, the slot offset locations may be deterministically derived (or fixed) from the legacy Release 15 offset indicated in the CG activation (referred to herein, as $K_2$), the periodicity P, and new parameters n and z, where n is the number of total configured slot offsets, and z is the transmission resource (for example, slot/mini-slot) duration. For example, one possible function can be derived if the Release 15 slot offset indicates a slot $K_2$ from the beginning of the periodicity, then the slot offsets may be such that there is a gap between the each slot offsets of at least $K_2+z$, so that the number of offsets for this periodicity, initial slot offset, and transmission duration z can be configured such that $$n \leq \min\left\{\frac{P}{K_2+z}, N\right\}.$$

However, since the gap of $K_2+z$ may be too short given large periodicities and the maximum number of slot offsets per periodicity, there can be an additional slot gap g that may be added at the end of the resource (for example, slot/mini-slot) transmission duration. Thus, the slot offsets can occur at slots $\{K_2, (i-1)(K_2+z+g)\}$, i=2, . . . , n, and the gap can be found by $$g = \left\lfloor \frac{P - n(K_2+z)}{n} \right\rfloor.$$

In the example of FIG. 8, $K_2=1$, z=2, n=2, and g=1.

In embodiments, the slot offsets can be emulated via a bitmap that can configure certain slots via a bitmap of length X and bitmap time granularity y within a periodicity. For so example, the bitmap can enable or disable resources (for example, slots/mini-slots) in granularity of z, where the granularity y can be determined by X and P. In the case of short periodicities, for example, 2 OS, 7 OS, 1 slot, etc., the bitmap granularity can be constrained to be such it fits the service/traffic type, and only the first $X_1$ bits of the bitmap are used for the offsets, while the remaining $X-X_1$ bits are set to zero. In the case of long periodicities, such that the bitmap signaling duration is shorter than the periodicity, then the bitmap indication simply repeats until it covers the entire duration of the periodicity.

In embodiments, the offset and duration values are provided through two distinct bitmap sequence that have the sane length and may be configured through RRC. In embodiments, X bits may be introduced within the DCI in order to signal, a specific element, or the first or last $2^X-1$ elements or group of elements contained in the RRC sequences to use within a period P for configured grant transmission. In embodiments, the value of X determines the specific elements of the RRC sequences which are used. Some signaling examples of various embodiments are provided below.

Some embodiments may use signaling of one element: given that the RRC sequences are composed by the following elements: n=[3, 9, 24, 36, 96, 107, 156, 200]; z=[2, 3, 5, 2, 9, 10, 2, 8], and given 3 bits in the DCI, these three bits may indicate which value of n or z to use.

Some embodiments may use signaling of first $2^X-1$ elements: given that the RRC sequences are composed by the following elements: n=[3, 9, 24, 36, 96, 107, 156, 200]; z=[2, 3, 5, 2, 9, 10, 2, 8], and given 3 bits in the DCI, these three bits may indicate the first m elements to use. For instance, if X=001, then only n={3} and m={2} is used; if X=011, then n={3, 9, 24}, and m={2, 3, 5} may be used.

Some embodiments may use signaling of group of elements. In this case, a look-up table may be formed, and every element of X correspond to a specific group of element of n and z.

In embodiments, a CG UE can have a table, where each entry in the table is associated with an offset configuration, where the slot offset configuration table can contain one offset format, such as a format from any of the different embodiments mentioned in this document. For example, in the entry of the table with index j, the UE is configured with n(j) slot offsets, and slot/mini-slot duration z(j), and these offsets and slot duration can be configured by higher layers. For example, the entry in index j of the table can have slot offsets $\{K_{2,1}(j), \ldots, K_{2,n(j)}(j)\}$, where the total number of slot offsets n(j) may different in each entry j. In one embodiment, each slot offset configuration in the table can have a sequence of slot offsets and associated sequence of slot/min-slot durations $\{z_1(j), \ldots, z_{n(j)}(j)\}$. In one embodiment, the table can be configured with slot bitmaps that indicate enabled or disabled slots/mini-slots, and a bitmap granularity parameter. For example, the bitmap in table index j can be the vector x(j) of length X(j), and granularity can be y(j). In one embodiment, the total number of entries in the table may be M, for example, M=16, and the CG activation can signal one of the offset configurations using $[\log_2 M]$ bits. In one embodiment, the UE 108 may be configured in its CG activation with an index from its table to indicate the slot offsets to use, configured by RRC for CG type 1, and by the gNB 104 in the DCI activation for CG type 2. In embodiments, the UE 108 may select the index from the table autonomously according to its current traffic demands, and indicate the slot offset configuration used in the CG-UCI.

In one embodiment, multiple legacy Rel-15 configurations are supported, and duplicated, each supporting a specific service/traffic, and for each of them an independent activation and deactivation may be used.

In some embodiments, the UE 108 using the configured grant operation in NR-U may have its time-domain allocation for a mini-slot transmission with PUSCH starting at symbol S and length L. Since configured grant transmissions in NR-U may occur in contiguous time occasions without gaps, the PUSCH format for the remaining transmissions may also be described.

According to the periodicity and slot offset of a configured grant configuration, the UE 108 can derive the first slot for configured grant transmission with a configured period. The first configured/indicated mini-slot for configured grant transmission in the first slot may be denoted as initial mini-slot, and may be indicated by way of the SLIV starting symbol and length parameters. The UE 108 may also be configured with a slot duration parameter Z, such that the UE 108 can access the channel during any of these configured slots, and transmit its first PUSCH according to its SLIV. By this way, given the initially configured PUSCH opportunity, indicated by the slot offset and SLIV, and given the slot duration configured for the UE 108, the initial PUSCH transmission of the UE 108 may occur at any of the configured transmission opportunities so at or after the initial configured opportunity and within the slot duration, according to when the UE traffic demand and contingent upon successful channel access via LBT. A UE may be configured with a mini-slot starting symbol S and length L, such that the remaining symbols in the slot are R=14−S−L, S=0, . . . , 13, L=1, . . . , 14. The possible PUSCH formats for the transmission of consecutive mini-slots over contiguous OFDM symbols are outlined, including the behavior of for when R>0.

In one embodiment, after the initial mini-slot with starting symbol S and length L, one or more mini-slots of length R>0 may begin in OS #S+L and ends in OS #13, such that the PUSCH in the remaining slots may occupy the entire slot duration. An example of this can be observed in FIG. 9.

Figure 9:
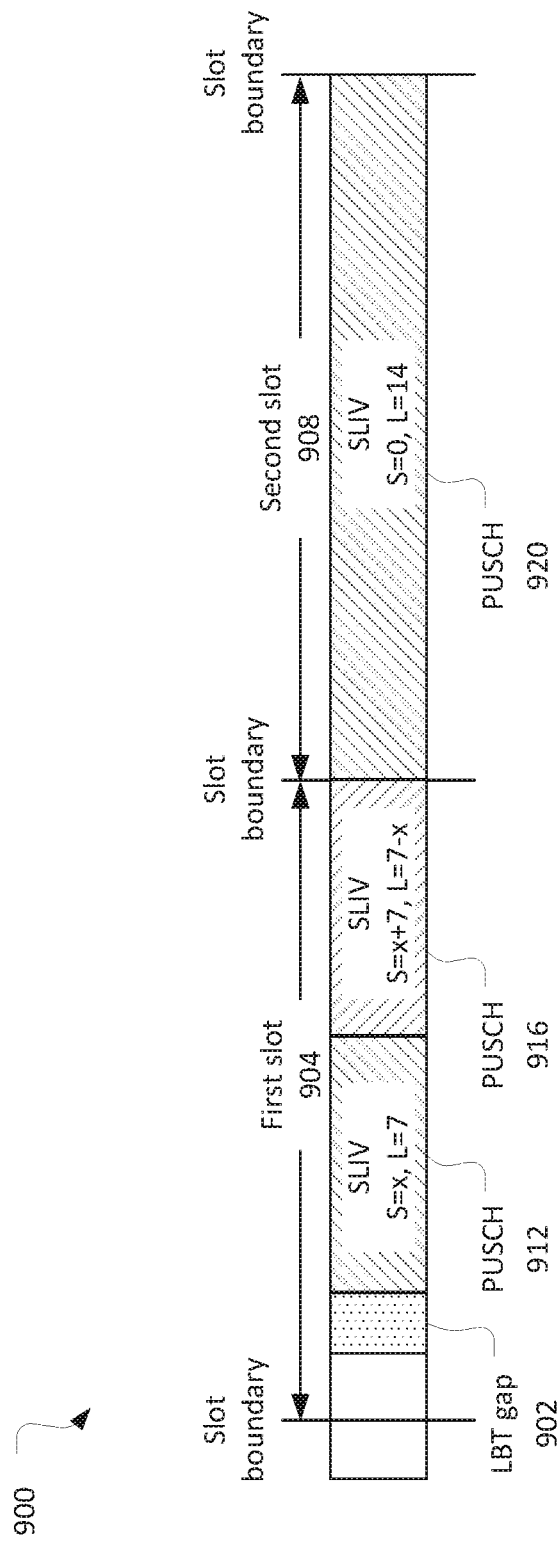
FIG. 9 illustrates a transmission sequence in accordance with some embodiments.

FIG. 9 illustrates a transmission sequence 900 in accordance with some embodiments. The transmission sequence 900 may include a first slot 904 followed by a second slot 908. A first PUSCH 912, which follows an LBT gap 902, is to be transmitted in a first mini-slot corresponding to S=x and L=7. A second PUSCH 916 may be transmitted in a second mini-slot corresponding to S=x+7 and L=7−x. In this manner, the length of the second mini-slot may be based on the starting position of the first mini-slot.

In embodiments, after the initial mini-slot, the first PUSCH transmission may be mapped to all of the remaining OFDM symbols in the initial slot after the starting symbol S, regardless of the configured length of the PUSCH L, and the remaining PUSCH transmissions may be mapped to a full slot. In embodiments, after the initial mini-slot with starting symbol S and length L, K mini-slots of combined length R>0 may be transmitted, such that the last mini-slot may be mapped to all of the remaining OFDM symbols in the initial slot after the first K−1 mini-slots. In embodiments, the previous cases can be implemented together, where a mini-slot PUSCH of length R may be transmitted after K initial mini-slots if R>1, while the $K^{th}$ initial mini-slot PUSCH is extended to end at OS #13 if R≤1, and the remaining PUSCH in the subsequent slots are mapped to the full slot.

In embodiments, when the UE 108 is configured with a PUSCH starting symbol S and length L, the UE may transmit mini-slot transmissions for the remainder of its uplink burst. In one embodiment, the UE may be configured with mini-slot start symbols and lengths such that the mini-slots evenly occupy the full slot duration. In embodiments, the mini-slots may have any start symbol S and length L, and the remaining PUSCHs are mapped to the same exact symbols in the subsequent slots, leaving a gap in the uplink transmission. In embodiments, the mini-slots may be contiguously or non-contiguously configured, and have any start symbol S and length L so that a mini-slot does not span across two slots.

In some embodiments, a particular mini-slot for a PUSCH may be allocated such that its starting symbol and length causes it to cross the slot boundary. In one embodiment, the UE 108 can transmit its PUSCH mini-slots contiguously in time without any gaps for the entirety of the uplink burst.

The UE 108 may transmit all PUSCHs according to the configured S and L as long as they fit within a slot, and for the case where the mini-slot PUSCH(j) which begins in slot T spans across the slot boundary, the UE may break the mini-slot PUSCH into two mini-slot PUSCH transmissions so that the first mini-slot PUSCH(j,1) will end at OS #13 of the slot T, and the second mini-slot PUSCH(j,2) may occur in slot T+1. Both of these mini-slot PUSCHs could carry front loaded DMRS. In some embodiments, the two mini-slots that are derived from a mini-slot that crosses a slot boundary may be referred to a derived mini-slots.

In one embodiment, mini-slot PUSCH(j+1) starts no later than OS #12. In one embodiment, the length of mini-slot PUSCH(j,1) is $L_1$=R and length of mini-slot PUSCH(j,2) is $L_2$=L−R, such that $L_1+L_2$=L, such that the overall length of the two combined mini-slots is the same as the original length of mini-slot PUSCH(j). An example of this embodiment can be seen in FIG. 10.

Figure 10:
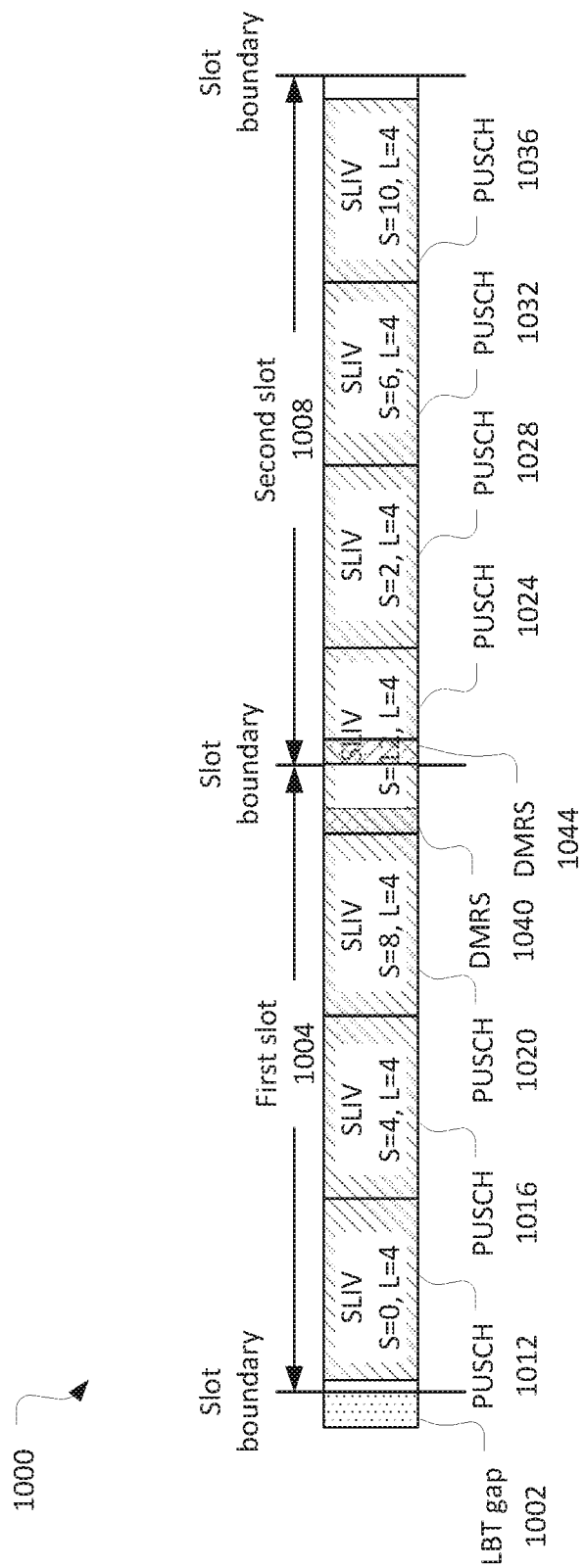
FIG. 10 illustrates a transmission sequence in accordance with some embodiments.

FIG. 10 includes a transmission sequence 1000 in accordance with some embodiments. The transmission sequence 1000 may include a first slot 1004 and a second slot 1008. A plurality of consecutive mini-slots, each having a length of 4, may be configured across the first slot 1004 and the second slot 1008. The mini-slots may correspond to PUSCHs 1012, 1016, 1020, 1024, 1028, 1032, and 1036. PUSCH 1024 way be in a mini-slot that spans the slot boundary. Therefore, the mini-slot may be divided into two derived mini-slots, one at the end of the first slot 1004 and one at the beginning of the second slot 1008. A DMRS 1040 may be included in the first symbol transmitted in the PUSCH of the first derived mini-slot and DMRS 1044 may be included in the first symbol transmitted in the PUSCH of the second derived mini-slot.

Figure 11:
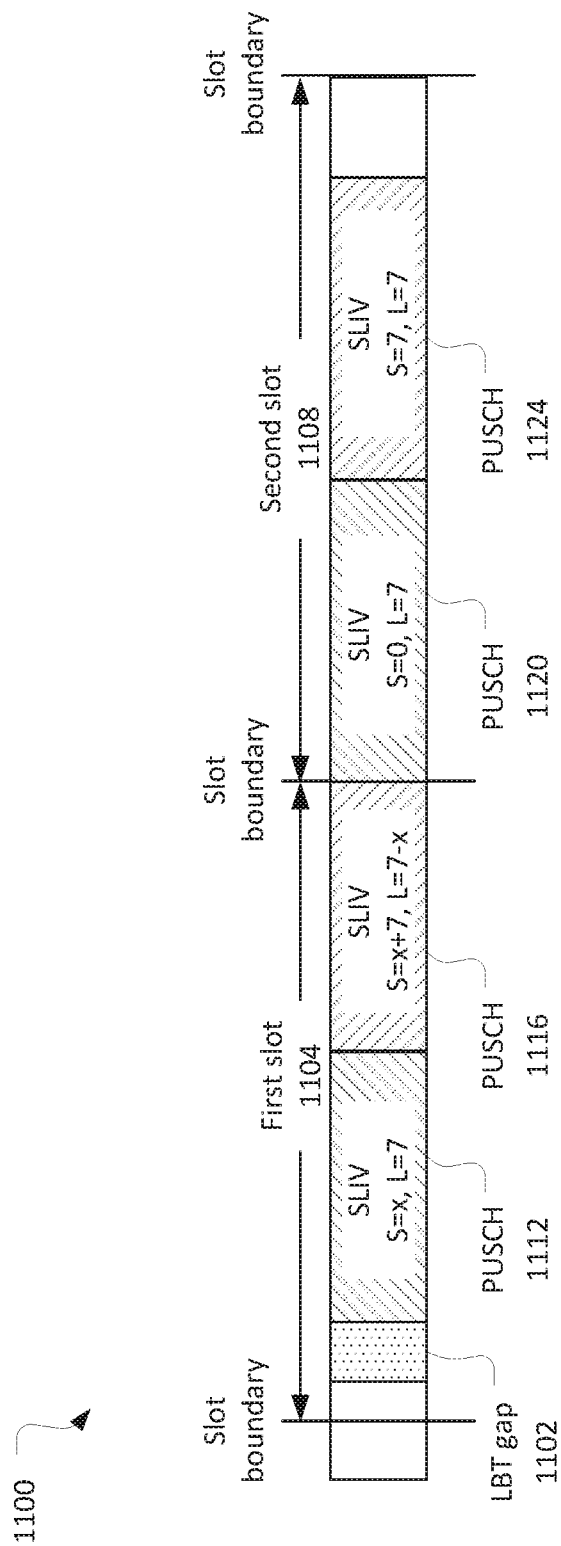
FIG. 11 illustrates a transmission sequence in accordance with some embodiments.

In embodiments, the length of mini-slot PUSCH(j,1) is $L_1$=R and length of mini-slot PUSCH(j,2) is $L_2$=L−R+1, such that $L_1+L_2$=L+1, such that the overall length number of OSs available for data and UCI remains L−1. In embodiments, the length of mini-slot so PUSCH(j,1) is $L_1$=R and the length of mini-slot PUSCH(j,2) is $L_2$=L, so that the total length of mini-slot PUSCH(j) is increased to $L_1+L_2$=L+R. In embodiments, if R>1, then only mini-slot PUSCH(j,1) may be transmitted with $L_1$=R, and the next mini-slot PUSCH (j+1) may be transmitted in slot T+l starting from OS #0, for example as shown in FIG. 11, FIG. 11 illustrates a transmission sequence 1100 in accordance with some embodiments. The transmission sequence 1100 may include a first slot 1104 and a second slot 1108. An LBT gap 1102 may occur before a PUSCH 1112 is transmitted in an initial mini-slot having S=x and L=7. A boundary mini-slot may be divided into two derived mini-slots. The first derived mini-slot may have S=x+7 and L=7−x, which carries PUSCH 1116, and the second derived mini-slot may have S=0 and L=7, which carries PUSCH 1120 in the second slot 1108. Another mini-slot, having S=7 and L=7, may be in the second slot 1108 and carry PUSCH 1124.

In one embodiment, mini-slot PUSCH(j,1) and mini-slot PUSCH(j,2) may be transmitted using the same redundancy version ID (RVID). For example, the RVID assigned for PUSCH(j,1) and PUSCH(j,2) could be the RVID assigned for PUSCH(j) in case PUSCH(j) does not cross slot boundary. In embodiments, mini-slot PUSCH(j,1) may be transmitted with RVID-a, mini-slot PUSCH(j,2) may be transmitted with RVID-b, such that RVID-a and RVID-b∈{0, 1, 2, 3} or a larger set, for example, {0, 1, 2, 3, 4, 3, 6, 7}. In one embodiment, one of the RVIDs may be equal to either 0 or 3 for the set {0, 1, 2, 3}. If the set is different than {0, 1, 2, 3}, the selection of one of the RVIDs should be done such that to ensure self-decodability. If $L_1 \geq L_2 \Rightarrow$ RVID-a=0, otherwise RVID-b=0.

In some embodiments, the UE 108 may be configured with a mini-slot PUSCH, such that given the starting slot offset, SLIV, and time durations parameter, the UE may only transmit one PUSCH in each slot, and the transmission may follow the SLIV, regardless of whether a gap exists between transmissions or not.

Figure 12:
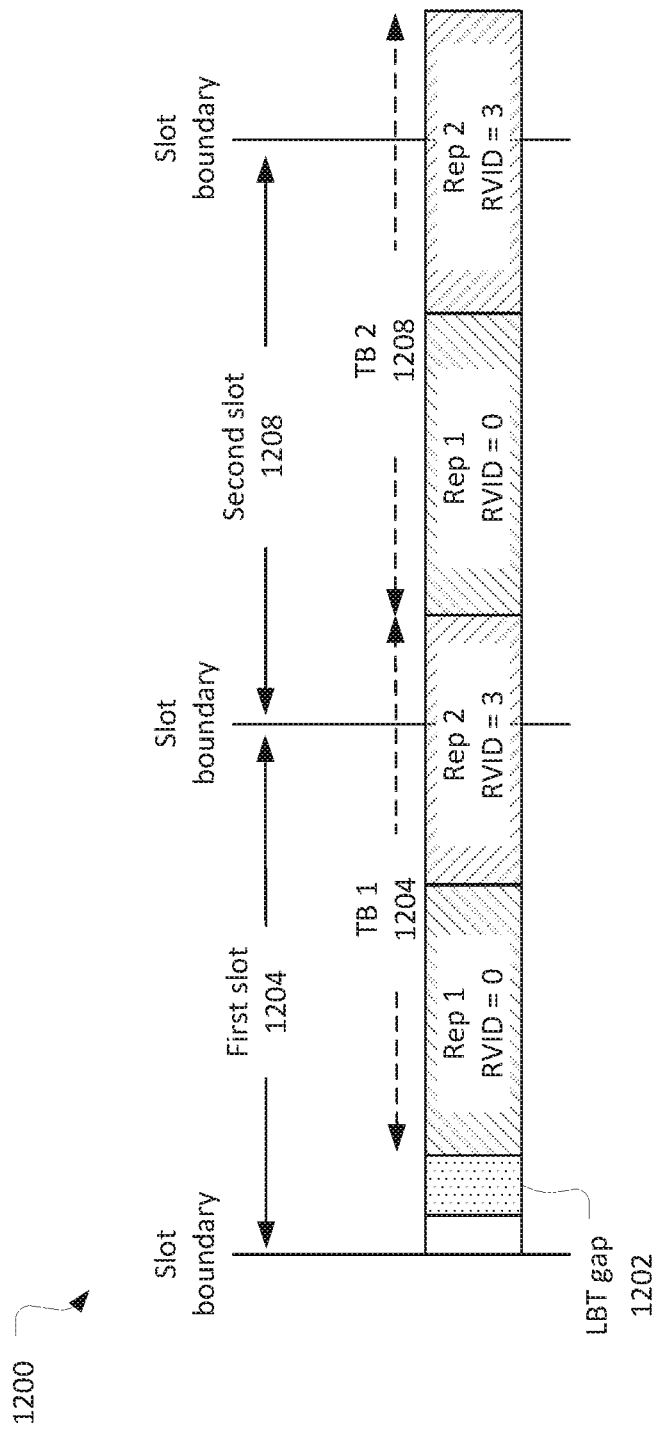
FIG. 12 illustrates a transmission sequence in accordance with some embodiments.

In some embodiments, the UE 108 using the configured grant operation in NR-U may be configured to transmit repetitions of its TB via the parameter repK, such that the mini-slot PUSCH has to be transmitted repK times, as given by the example in FIG. 12.

FIG. 12 illustrates a transmission sequence 1200 in accordance with some embodiments. The transmission sequence 1200 may include first slot 1204 and second slot 1208. The UE 108 may be configured to transmit two repetitions in each TB. For example, the UE 108 may transmit Rep 1 and Rep 2 in the TB 1 1204, and may transmit Rep 1 and Rep 2 in the TB 2 so 1208. An LBT gap 1202 may occur before TB.

The UE 108 may be configured with a redundancy version sequence as one of the following sequences: {0}, {0, 3}, {0, 2, 3, 1}. The repetitions of the TB may follow any of the aforementioned embodiments for PUSCH, including full slot transmissions of each repetition for the remaining PUSCH transmissions after the initial PUSCH, or may follow the mini-slot PUSCH format indicated by the length L of the first mini-slot. In one embodiment, the UE 108 may transmit all of its PUSCH using mini-slot configuration, including the repetitions, and the repetitions RVIDs may follow those outlined in the above embodiments. In one embodiment, if the $k^{th}$ repetition of mini-slot PUSCH(j), call it mini-slot PUSCH(j+k), k=1, . . . , repK, is configured to transmit with RVID-x, and is such that it will span across the slot boundary, then mini-slot PUSCH(j+k) is broken into two more repetitions mini-slot PUSCH(j+k 1) and mini-slot PUSCH(j+k 2). In one embodiment, mini-slot PUSCH(j+k, 1) and mini-slot PUSCH(j+k, 2) are transmitted using the same RVID-x. In embodiments, mini-slot PUSCH(j+k, 1) is transmitted with RVID-a, and mini-slot PUSCH(j+k, 2) is transmitted with RVID-b. For example, if $L_1 \geq L_2 \Rightarrow$ RVID-a=0 and RVID-b=RVID-x, otherwise RVID-b=0 and RVID-a=RVID-x.

In various embodiments, the UE 108 may indicate its ending symbol explicitly for its final PUSCH transmission. The ending symbol may depend on where the LBT gap is expected for the gNB 104 or other UEs. It may be that all UEs with configured grants in a given bandwidth part (BWP) may be configured with the same SLIV, such that LBT gaps between different UEs may be common, or it can be that the SLIV is not necessarily the same between UEs, such that the potential LBT gap for one UE is located in symbols that coincide with potential PUSCH data symbols for another UE. In one embodiment, if the UEs share a common SLIV, for all configured transmission occasions, and the LBT gap occupies the symbols before the PUSCH indicated SLIV, then for a UE's final PUSCH transmission, it may puncture the final symbols of the final PUSCH that coincide with the LBT gap of other UEs or gNB. In one embodiment, if the UEs share a common SLIV and LBT gap coincides with the first symbols of the PUSCH, then for a UE transmitting its final PUSCH in a burst, it may transmit the full length of the PUSCH, according to the SLIV. In embodiments, if the UEs do not share a common SLIV, such that starting symbols and lengths are different from UE to UE, then the UE may transmit its final PUSCH for the full length, according to its SLIV. In embodiments, if a UE is configured with a SLIV such that the length indicates that the final symbol coincides with the LBT gap of the gNB, then it always punctures the final symbols of the PUSCH.

In embodiments, the number of last symbols not available for configured grant transmission in the last slot derived by periodicity, slot offset and number of slots of the configured grant transmission is configured in the configured grant configuration. In embodiments, the number of last symbols not available for configured grant transmission in the last slot derived by periodicity, slot offset and number of slots of the configured grant transmission may be indicated in the activation DCI. In embodiments, the number of last symbols not available for configured grant transmission in the last slot derived by periodicity, slot offset and number of slots of the configured grant transmission may be predefined. In the above embodiments, instead of the information on the number of last symbols not available for configured gram transmission in the last slot, it could the last symbol available for configured grant transmission in the last slot.

From the different embodiments above, a combination of the described features can be used to implement the time-domain allocation for a CG UE using the unlicensed operation of NR.

Aspects of the embodiments described herein may be implemented through devices or components performing operation flows/algorithmic structures. FIGS. 13 and 14 illustrate some operation flows/algorithmic structures in accordance with some embodiments. Some or all of the details of FIGS. 13 and 14 may be performed by a UE, for example, UE 108 of FIG. 1 or UEs 1501a or 1501b of FIG. 15; a gNB, for example, gNB 104 of FIG. 1 or access nodes 1511a or 1511b of FIG. 15; components, for example, protocol processing circuitry 112/120 or RFFE circuitry 116/124 of FIG. 1, baseband circuitry 1610 or radio front end module 1615 of FIG. 16, baseband circuitry 1710 or radio front end module 1715 of FIG. 17; or processors 1810 and memory storage devices 1820 of FIG. 18.

FIG. 13 illustrates an operation flow/algorithmic structure 1300 in accordance with some embodiments.

The operation flow/algorithmic structure 1300 may include, at 1304, generating or processing configuration information messages that indicate CG periodicity and bit-map. In various embodiments, other parameters/information may be conveyed through the configuration information messages including, but not limited to, circular array information, offset values, granularities, repetition values, etc. In embodiments in which the operation flow/algorithmic structure 1300 is implemented by a UE, 1304 may include processing configuration information messages received by the UE. In embodiments in which the operation flow/algorithmic structure 1300 is implemented by a gNB, 1304 may include generating configuration information messages to be transmitted to the UE.

In various embodiments the configuration messages may be RRC messages, DCI, or system information broadcast (SIB) messages. The one or more configuration messages may be transmitted at different times by different signaling types for different purposes. For example, in some embodiments, initial configuration information may be semi-statically configured to the UE by RRC messages. Subsequently, DCI may be used to select, indicate, or update one or more configuration parameters based on the previous configured parameters. For example, the RRC signaling may be used to configure a lookup table, as described elsewhere herein, while DCI may be used to signal a selection of one or more resources by reference to the previously configured lookup table.

In various embodiments, the CG periodicity and bitmap may be used by the UE and the gNB to determine which time-domain resources are available for CG uplink transmissions. As described herein, the respective lengths of the bitmap and the CG periodicity may have a bearing on how the bitmap values are mapped against the resources of one or more RAPs defined by the CG periodicity. In some embodiments, only some of the bitmap values will be used in this determination; however, in other embodiments, all of the bitmap values may be used.

After the UE determines the time-domain resources allocated for CG uplink transmissions, the UE may identify information that is to be transmitted in the uplink transmission. The information may include data or control signals that are to be transmitted to the gNB in one or more physical channels such as, but not limited to, PUSCH, PUCCH, etc.

The operation flow/algorithmic structure 1300 may further include, at 1308, decoding or encoding a CG uplink transmission based on the CG periodicity and the bitmap. In embodiments in which the operation flow/algorithmic structure 1300 is implemented by a UE, 1308 may encoding the CG uplink transmission. In embodiments in which the operation flow/algorithmic structure 1300 is implemented by a gNB, 1308 may include decoding the CG uplink transmission.

The uplink transmission may be encoded on the uplink resources of the different RAPs as indicated by the bitmap. As both the UE and the gNB may have a consistent understanding of how the bitmap values are to be associated with the corresponding resource units, both devices will know which resources may be used for the uplink transmissions. In some embodiments, the gNB may blindly decode the available resources at least until appropriate UCI is detected that provides an indication of which of the available resources are to actually be used for uplink transmissions by the UE.

Before transmitting the encoded uplink transmissions, some embodiments may include the UE performing one or more LBT procedures. To perform an LBT procedure, the UE may first perform a clear channel assessment (CCA) by listening on an operating channel for a period of time that corresponds to a CCA observation time. If the UE detects energy on the channel over a predetermined threshold, the UE may determine a backoff period based on a random value multiplied by the CCA observation time. After the backoff period the UE may again attempt a CCA. If the channel is occupied for more than a predetermined number of CCAs, the LBT procedure may be considered unsuccessful. If the UE determines the energy detected through the CCA observation time does not exceed the predetermined threshold, the LBT procedure may be considered successful.

In some embodiments, the LBT procedure may be performed for only the first transmission of a period. For example, if the LBT procedure is performed successfully for the first transmission, the UE may be able to transmit both the first and any subsequent transmissions.

FIG. 14 illustrates an operation flow/algorithmic structure 400 in accordance with some embodiments.

The operation flow/algorithmic structure 1400 may include, at 1404, receiving slot-offset configuration information and duration information. The slot-offset configuration information may include information to configured a plurality of slot offsets within a CG periodicity. The duration information may indicate a number of consecutive resources (for example, slots, mini-slots, resource units, etc.) that are allocated for CG after individual slot offsets of the plurality of slot offsets. The durations may be the same for all the slot offsets, or may be different.

In some embodiments, the slot-offset configuration information and the duration information may configure one or more sequences, bitmaps, or lookup tables that the UE may subsequently use to determine the specific slot offset values and durations.

In some embodiments, the slot offsets may be with respect to a system frame number when the UE is configured with a CG Type 1; and may be with respect to an activation DC when the UE is configured with a CG Type 2.

The configuration information received at 1404 may, in some embodiments, additionally/alternatively include a legacy offset indication, a CG periodicity, circular array information, array offset values, redundancy version information, repetition information, etc.

The operation flow/algorithmic structure 1400 may further include, at 1408, selecting uplink resources based on slot-offset configuration information and duration information. In some embodiments, the selection of the uplink resources may include the UE selecting a subset of the resources that are indicated as being available by the information received at 1404. This selection of the subset of resources may be based on the UE's autonomous decision (based on, for example, traffic conditions) or based on subsequent configuration information transmitted to the UE by the gNB.

The operation flow/algorithmic structure 1400 may further include, at 1412, encoding a CG uplink transmission using the selected uplink resources. Similar to that discussed above with respect to FIG. 13, in some embodiments, the UE may perform an LBT operation before transmitting the encoded data to the gNB.

Figure 15:
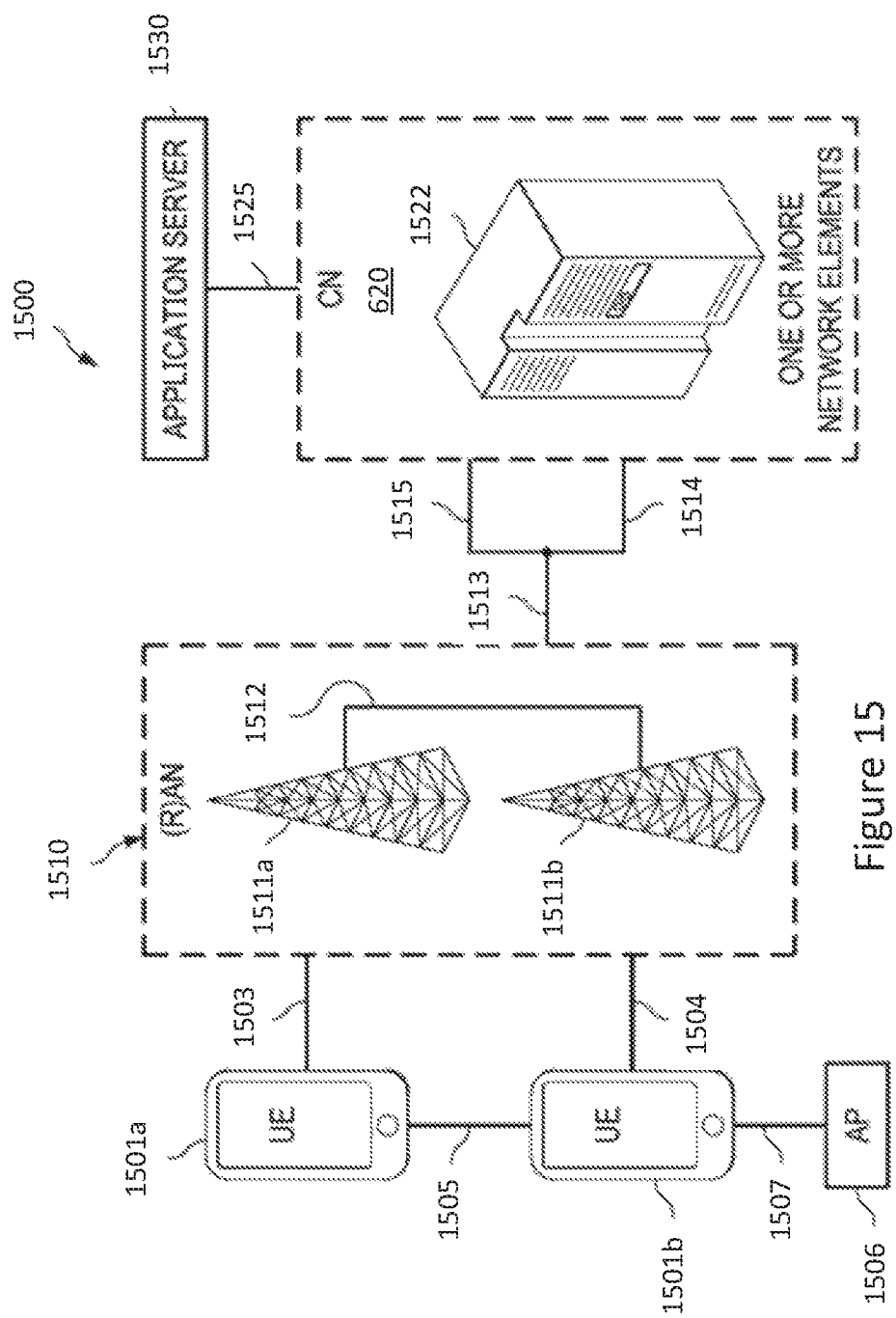
FIG. 15 illustrates an example architecture of a system in accordance with some embodiments.

Turning now to FIG. 15, an example architecture of a system 1500 of a network is illustrated, in accordance with various embodiments. The following description is provided for an example system 1500 that operates in conjunction with 5G or NR system standards as provided by 3GPP technical specifications, for example. However, the example embodiments are not limited in this regard, and the described embodiments may apply to other networks that benefit from the principles described herein, such as future 3GPP systems (e.g., Sixth Generation (6G)) systems or other wireless networks.

As shown by FIG. 15, the system 1500 includes UE 1501a and UE 1501b (collectively referred to as "UEs 1501"). In this example, UEs 1501 are illustrated as smartphones (e.g., handheld touchscreen mobile computing devices connectable to one or more cellular networks) but may also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, MTC devices M2M, IoT devices, and/or the like.

In some embodiments, any of the UEs 1501 may be Internet of Things (IoT) UEs, which may comprise a network access layer designed for low-power IoT applications utilizing short-lived UE connections. An IoT UE can utilize technologies such as M2M or MTC for exchanging data with an MTC server or device via a PLMN, ProSe or D2D communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (for example, keep-alive messages, status updates, etc.) to facilitate the connections of the IoT network.

The UEs 1501 may be configured to connect, for example, communicatively couple, with a Radio Access Network (RAN) 1510. In embodiments, the RAN 1510 may be an NG RAN or a 5G RAN. As used herein, the term "NG RAN" or the like may refer to a RAN 1510 that operates in an NR or 5G system 1500. The UEs 1501 utilize connections (or channels) 1503 and 1504, respectively, each of which comprises a physical communications interface or layer.

In this example, the connections 1503 and 1504 are illustrated as an air interface to enable communicative coupling, and can be consistent with cellular communications protocols, such as a 3GPP 5G/NR protocol or any of the other communications protocols discussed herein. In embodiments, the UEs 1501 may directly exchange communication data via a ProSe interface 1505. The ProSe interface 1505 may alternatively be referred to as a sidelink (SL) interface 1505.

The UE 1501b is shown to be configured to access an AP 1506 (also referred to as "WLAN node 1506," "WLAN 1506," "WLAN Termination 1506," "WT 1506" or the like) via connection 1507. The connection 1507 can comprise a local wireless connection, such as a connection consistent with any IEEE 802.11 protocol, wherein the AP 1506 would comprise a wireless fidelity (Wi-Fi®) router. In this example, the AP 1506 is shown to be connected to the Internet without connecting to the core network of the wireless system (described in further detail below). In various embodiments, the UE 1501b, RAN 1510, and AP 1506 may be configured to utilize LWA operation and/or LWIP operation. The LWA operation may involve the UE 1501b in RRC_CONNECTED being configured by a RAN node 1511a-b to utilize radio resources of LTE and WLAN. LWIP operation may involve the UE 1501b using WLAN radio resources (e.g., connection 1507) via IPsec protocol tunneling to authenticate and encrypt packets (e.g., IP packets) sent over the connection 1507. IPsec tunneling may include encapsulating the entirety of original IP packets and adding a new packet header, thereby protecting the original header of the IP packets.

The RAN 1510 can include one or more access nodes (ANs) or RAN nodes 1511a and 1511b (collectively referred to as "RAN nodes 1511") that enable the connections 1503 and 1504. As used herein, the terms "access node," "access point," or the like may describe equipment that provides the radio baseband functions for data and/or voice connectivity between a network and one or more users. These access nodes can be referred to as BS, gNBs, RAN nodes, eNBs, NodeBs, RSUs, TRxPs or TRPs, and so forth, and can comprise ground stations (e.g., terrestrial access points) or satellite stations providing coverage within a geographic area (e.g., a cell). As used herein, the term "NG RAN node" or the like may refer to a RAN node 1511 that operates in an NR or 5G system 1500 (for example, a gNB), and the term "E-UTRAN node" or the like may refer to a RAN node 1511 that operates in an LTE or 4G system (e.g., an eNB). According to various embodiments, the RAN nodes 1511 may be implemented as one or more of a dedicated physical device such as a macrocell base station, and/or a low power (LP) base station for providing femtocells, picocells or other like cells having smaller coverage areas, smaller user capacity, or higher bandwidth compared to macrocells.

In vehicle-to-everything (V2X) scenarios one or more of the RAN nodes 1511 may be or act as a road-side unit (RSU). An RSU may refer to any transportation infrastructure entity used for V2X communications. An RSU may be implemented in or by a suitable RAN node or a stationary (or relatively stationary) UE, where an RSU implemented in or by a UE may be referred to as a "UE-type RSU," an RSU implemented in or by an eNB may be referred to as an "eNB-type RSU," an RSU implemented in or by a gNB may be referred to as a "gNB-type RSU," and the like. In one example, an RSU is a computing device coupled with radio frequency circuitry located on a roadside that provides connectivity support to passing vehicle UEs 1501 (vUEs). The RSU may also include internal data storage circuitry to store intersection map geometry, traffic statistics, media, as well as applications/software to sense and control ongoing vehicular and pedestrian traffic. The RSU may operate on the 5.9 GHz Direct Short Range Communications (DSRC) band to provide very low latency communications required for high speed events, such as crash avoidance, traffic warnings, and the like. Additionally or alternatively, the RSU may operate on the cellular V2X band to provide the aforementioned low latency communications, as well as other cellular communications services. Additionally or alternatively, the RSU may operate as a Wi-Fi hotspot (2.4 GHz band) and/or provide connectivity to one or more cellular networks to provide uplink and downlink communications. The computing device(s) and some or all of the radiofrequency circuitry of the RSU may be packaged in a weatherproof enclosure suitable for outdoor installation, and may include a network interface controller to provide a wired connection (e.g., Ethernet) to a traffic signal controller and/or a backhaul network.

Any of the RAN nodes 1511 can terminate the air interface protocol and can be the first point of contact for the UEs 1501. In some embodiments, any of the RAN nodes 1511 can fulfill various logical functions for the RAN 1510 including, but not limited to, radio network controller (RNC) functions such as radio bearer management, uplink and downlink dynamic radio resource management and data packet scheduling, and mobility management.

In embodiments, the UEs 1501 can be configured to communicate using OFDM communication signals with each other or with any of the RAN nodes 1511 over a multicarrier communication channel in accordance with various communication techniques, such as, but not limited to, an OFDMA communication technique (e.g., for downlink communications) or a SC-FDMA communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 1511 to the UEs 1501, while uplink transmissions can utilize similar techniques. The grid can be a time-frequency grid, called a resource grid or time-frequency resource grid, which is the physical resource in the downlink in each slot.

Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements: in the frequency domain, this may represent the smallest quantity of resources that currently can be allocated. There are several different physical downlink channels that are conveyed using such resource blocks.

According to various embodiments, the UEs 1501 and the RAN nodes 1511 communicate data (for example, transmit and receive) data over a licensed medium (also referred to as the "licensed spectrum" and/or the "licensed band") and an unlicensed shared medium (also referred to as the "unlicensed spectrum" and/or the "unlicensed band").

To operate in the unlicensed spectrum, the UEs 1501 and the RAN nodes 1511 may operate using LAA, eLAA, and/or feLAA mechanisms. In these implementations, the UEs 1501 and the RAN nodes 1511 may perform one or more known medium-sensing operations and/or carrier-sensing operations in order to determine whether one or more channels in the unlicensed spectrum is unavailable or otherwise occupied prior to transmitting in the unlicensed spectrum. The medium/carrier sensing operations may be performed according to a listen-before-talk (LBT) protocol.

As discussed above, LBT is a mechanism whereby equipment (for example, UEs 1501 RAN nodes 1511, etc.) senses a medium (for example, a channel or carrier frequency) and transmits when the medium is sensed to be idle (or when a specific channel in the medium is sensed to be unoccupied). The medium sensing operation may include CCA, which utilizes at least energy detection (ED) to determine the presence or absence of other signals on a channel in order to determine if a channel is occupied or clear. This LBT mechanism allows cellular/LAA networks to coexist with incumbent systems in the unlicensed spectrum and with other LAA networks. ED may include sensing RF energy across an intended transmission band for a period of time and comparing the sensed RF energy to a predefined or configured threshold.

The RAN nodes 1511 may be configured to communicate with one another via interface 1512. The interface 1512 may be an Xn interface 1512. The Xn interface is defined between two or more RAN nodes 1511 (e.g., two or more gNDs and the like) that connect to 5GC 1520, between a RAN node 1511 (e.g., a gNB) connecting to 5GC 1520 and an eNB, and/or between two eNBs connecting to 5GC 1520. In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 1501 in a connected mode (e.g., CM-CONNECTED) including functionality to manage the UE mobility for connected mode between one or more RAN nodes 1511. The mobility support may include context transfer from an old (source) serving RAN node 1511 to new (target) serving RAN node 1511; and control of user plane tunnels between old (source) serving RAN node 1511 to new (target) serving RAN node 1511. A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on SCTP. The SCTP may be on top of an IP layer, and may provide the guaranteed delivery of application layer messages. In the transport IP layer, point-to-point transmission is used to deliver the signaling PDUs. In other implementations, the Xn-U protocol stack and/or the Xn-C protocol stack may be same or similar to the user plane and/or control plane protocol stack(s) shown and described herein.

The RAN 1510 is shown to be communicatively coupled to a core network—in this embodiment, core network (CN) 1520. The CN 1520 may comprise a plurality of network elements 1522, which are configured to offer various data and telecommunications services to customers/subscribers (e.g., users of UEs 1501) who are connected to the CN 1520 via the RAN 1510. The components of the CN 1520 may be implemented in one physical node or separate physical nodes including components to read and execute instructions from a machine-readable or computer-readable medium (e.g., a non-transitory machine-readable storage medium). In some embodiments, NFV may be utilized to virtualize any or all of the above-described network node functions via executable instructions stored in one or more computer-readable storage mediums (described in further detail below). A logical instantiation of the CN 1520 may be referred to as a network slice, and a logical instantiation of a portion of the CN 1520 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Generally, the application server 1530 may be an element offering applications that use IP bearer resources with the core network (e.g., UMTS PS domain, LTE PS data services, etc.). The application server 1530 can also be configured to support one or more communication services (e.g., VoIP sessions, PTT sessions, group communication sessions, social networking services, etc.) for the UEs 1501 via the CN 1520.

In embodiments, the CN 1520 may be a 5GC (referred to as "5GC 1520" or the like), and the RAN 1510 may be connected with the CN 1520 via an NG interface 1513. In embodiments, the NG interface 1513 may be split into two parts, an NG user plane (NG-U) interface 1514, which carries traffic data between the RAN nodes 1511 and a UPF, and the S1 control plane (NG-C) interface 1515, which is a signaling interface between the RAN nodes 611 and AMFs.

Figure 16:
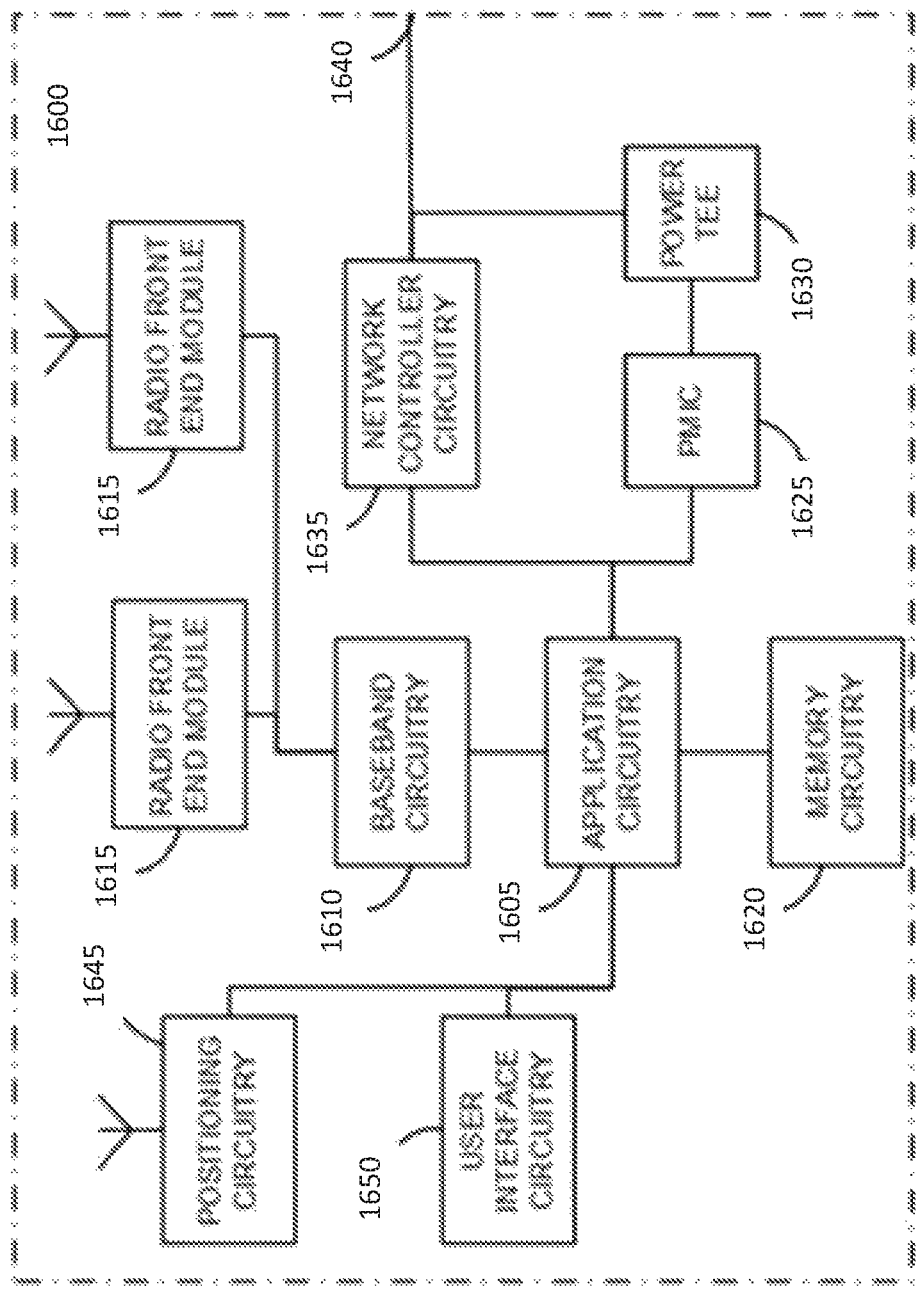
FIG. 16 illustrates an example of an infrastructure device in accordance with some embodiments.

FIG. 16 illustrates an example of infrastructure equipment 1600 in accordance with various embodiments. The infrastructure equipment 1600 (or "system 1600") may be implemented as a base station, radio head, RAN node such as the RAN nodes 1511 and/or AP 1506 shown and described previously, application server(s) 1530, and/or any other element/device discussed herein. In other examples, the system 1600 could be implemented in or by a UE.

The system 1600 includes application circuitry 1605, baseband circuitry 1610, one or more radio front end modules (RFEMs) 1615, memory circuitry 1620, power management integrated circuitry (PMIC) 1625, power tee circuitry 1630, network controller circuitry 1635, network interface connector 1640, satellite positioning circuitry 1645, and user interface 1650. In some embodiments, the device 1600 may include additional elements such as, for example, memory-storage, display, camera, sensor, or input/output (I/O) interface. In other embodiments, the components described below may be included in more than one device. For example, said circuities may be separately included in more than one device for CRAN, vBBU, or other like implementations.

Application circuitry 1605 includes circuitry such as, but not limited to one or more processors (or processor cores), cache memory, and one or more of low drop-out voltage regulators (LDOs), interrupt controllers, serial interfaces such as SPI, I2C or universal programmable serial interface module, real time clock (RTC), timer-counters including interval and watchdog timers, general purpose input/output (I/O or IO), memory card controllers such as Secure Digital (SD) MultiMediaCard (MMC) or similar. Universal Serial Bus (USB) interfaces, Mobile Industry Processor Interface (MIPI®) interfaces and Joint Test Access Group (TAG) test access ports. The processors (or cores) of the application circuitry 1605 may be coupled with or may include memory/storage elements and may be configured to execute instructions stored in the memory/storage to enable various applications or operating systems to run on the system 1600. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 1605 may include, for example, one or more processor cores (CPUs), one or more application processors, one or more graphics processing units (GPUs), one or more reduced instruction set computing (RISC) processors, one or more Acorn RISC Machine (ARM) processors, one or more complex instruction set computing (CISC) processors, one or more digital signal processors (DSP), one or more FPGAs, one or more PLDs, one or more ASICs, one or more microprocessors or controllers, or any suitable combination thereof. In some embodiments, the application circuitry 1605 may comprise, or may be, a special-purpose processor/controller to operate according to the various embodiments herein. As examples, the processor(s) of application circuitry 1605 may include one or more Intel Pentium®, Core®, or Xeon® processor(s); Advanced Micro Devices (AMD) Ryzen® processor(s), Accelerated Processing Units (APUs), or Epyc® processors; ARM-based processor(s) licensed from ARM Holdings, Ltd, such as the ARM Cortex-A family of processors and the ThunderX2® provided by Cavium™, Inc.; a MIPS-based design from MIPS Technologies, Inc. such as MIPS Warrior P-class processors; and/or the like. In some embodiments, the system 1600 may not utilize application circuitry 1605, and instead may include a special-purpose processor/controller to process IP data received from an EPC or 5GC, for example.

In some implementations, the application circuitry 1605 may include one or more hardware accelerators, which may be microprocessors, programmable processing devices, or the like. The one or more hardware accelerators may include, for example, computer vision (CV) and/or deep learning (DL) accelerators. As examples, the programmable processing devices may be one or more a field-programmable devices (FPDs) such as field-programmable gate arrays (FPGAs) and the like; programmable logic devices (PLDs) such as complex PLDs (CPLDs), high-capacity PLDs (HCPLDs), and the like; ASICs such as structured ASICs and the like; programmable SoCs (PSoCs); and the like. In such implementations, the circuitry of application circuitry 1605 may comprise logic blocks or logic fabric, and other interconnected resources that may be programmed to perform various functions, such as the procedures, methods, functions, etc. of the various embodiments discussed herein. In such embodiments, the circuitry of application circuitry 1605 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up-tables (LUTs) and the like.

The baseband circuitry 1610 may be implemented, for example, as a solder-down substrate including one or more integrated circuits, a single packaged integrated circuit soldered to a main circuit board or a multi-chip module containing two or more integrated circuits.

User interface circuitry 1650 may include one or more user interfaces designed to enable user interaction with the system 1600 or peripheral component interfaces designed to enable peripheral component interaction with the system 1600. User interfaces may include, but are not limited to, one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a nonvolatile memory port, a universal serial bus (USB) port, an audio jack, a power supply interface, etc.

The radio front end modules (RFEMs) 1615 may comprise a millimeter wave (mmWave) RFEM and one or more sub-mmWave radio frequency integrated circuits (RFICs). In some implementations, the one or more sub-mmWave RFICs may be physically separated from the mmWave RFEM. The RFICs may include connections to one or more antennas or antenna arrays, and the RFEM may be connected to multiple antennas. In alternative implementations, both mmWave and sub-mmWave radio functions may be implemented in the same physical RFEM 1615, which incorporates both mmWave antennas and sub-mmWave.

The memory circuitry 1620 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), so magnetoresistive random access memory (MRAM), etc., and may incorporate the three-dimensional (3D) cross-point (XPOINT) memories from Intel® and Micron®, Memory circuitry 1620 may be implemented as one or more of solder down packaged integrated circuits, socketed memory modules and plug-in memory cards.

The PMIC 1625 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 1630 may provide for electrical power drawn from a network cable to provide both power supply and data connectivity to the infrastructure equipment 1600 using a single cable.

The network controller circuitry 1635 may provide connectivity to a network using a standard network interface protocol such as Ethernet, Ethernet over GRE Tunnels, Ethernet over Multiprotocol Label Switching (MPLS), or some other suitable protocol. Network connectivity may be provided to/from the infrastructure equipment 1600 via network interface connector 1640 using a physical connection, which may be electrical (commonly referred to as a "copper interconnect"), optical, or wireless. The network controller circuitry 1635 may include one or more dedicated processors and/or FPGAs to communicate using one or more of the aforementioned protocols. In some implementations, the network controller circuitry 1635 may include multiple controllers to provide connectivity to other networks using the same or different protocols.

The positioning circuitry 1645 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 1645 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 1645 may include a Micro-Technology for Positioning. Navigation, and Timing (Micro-PNT) IC that uses a master timing clock to perform position tracking/estimation without GNSS assistance. The positioning circuitry 1645 may also be part of, or interact with, the baseband circuitry 1610 and/or RFEMs 1615 to communicate with the nodes and components of the positioning network. The positioning circuitry 1645 may also provide position data and/or time data to the application circuitry 1605, which may use the data to synchronize operations with various infrastructure (e.g., RAN nodes, etc.), or the like.

The components shown by FIG. 16 may communicate with one another using interface circuitry, which may include any number of bus and/or interconnect (IX) technologies such as industry standard architecture (ISA), extended ISA (EISA), peripheral component interconnect (PCI), peripheral component interconnect extended (PCIx), PCI express (PCIe), or any number of other technologies. The bus/IX may be a proprietary bus, for example, used in a SoC based system. Other bus/IX systems may be included, such as an I2C interface, an SPI interface, point to point interfaces, and a power bus, among others.

Figure 17:
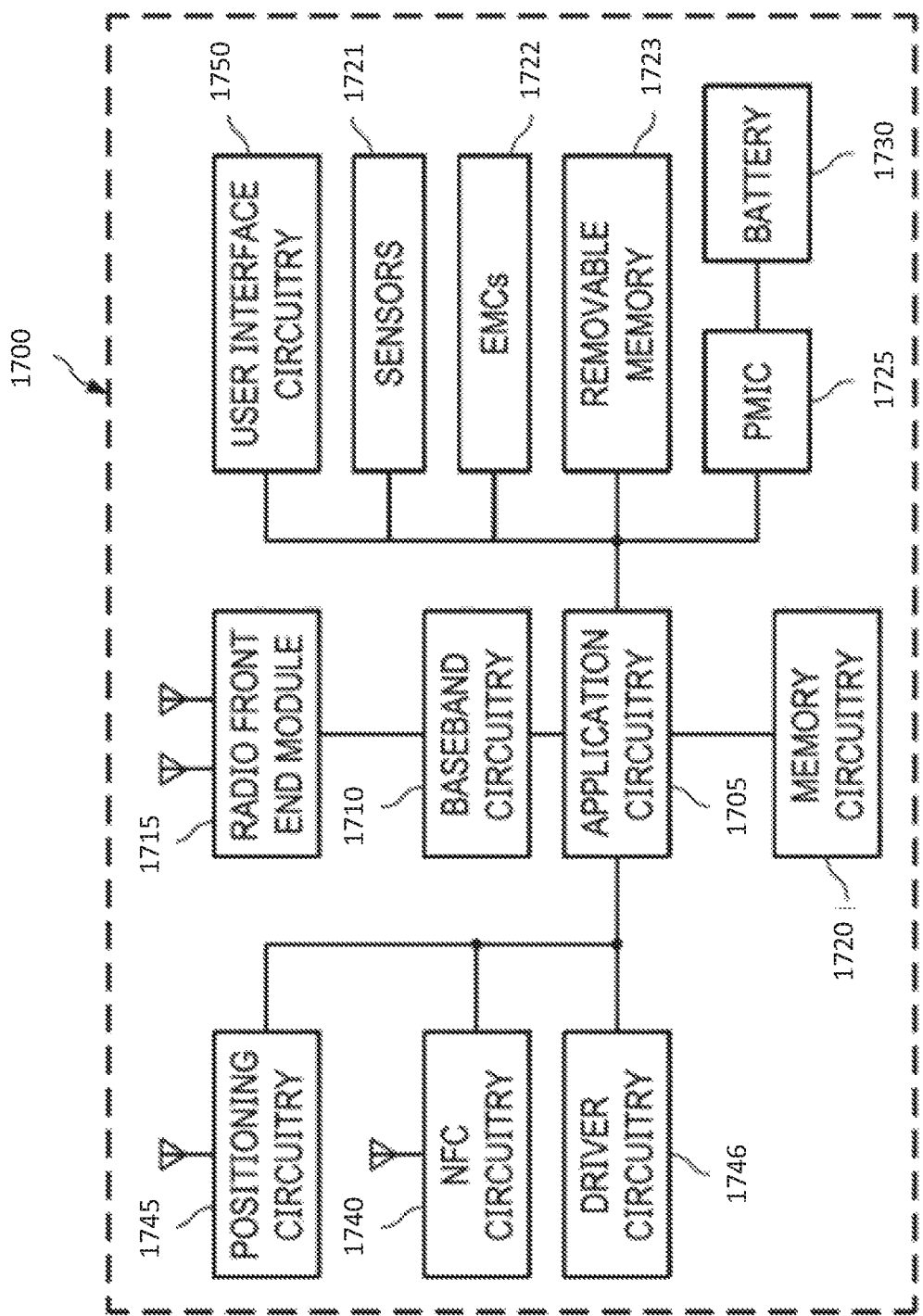
FIG. 17 illustrates an example of a platform (or "device") in accordance with some embodiments.

FIG. 17 illustrates an example of a platform 1700 (or "device 1700") in accordance with various embodiments. In embodiments, the computer platform 1700 may be suitable for use as UEs 601 and/or any other element/device discussed herein. The platform 1700 may include any combinations of the components shown in the example. The components of platform 1700 may be implemented as integrated circuits (ICs), portions thereof, discrete electronic devices, or other modules, logic, hardware, software, firmware, or a combination thereof adapted in the computer platform 1700, or as components otherwise incorporated within a chassis of a larger system. The block diagram of FIG. 17 is intended to show a high level view of components of the computer platform 1700. However, some of the components shown may be omitted, additional components may be present, and different arrangement of the components shown may occur in other implementations.

Application circuitry 1705 includes circuitry such as, but not limited to one or more processors (or processor cores), cache memory, and one or more of LDOs, interrupt controllers, serial interfaces, universal programmable serial interface module, RTC, timer-counters including interval and watchdog timers, general purpose I/O, memory card controllers such as SD MMC or similar, USB interfaces, MIPI® interfaces, and JTAG test access ports. The processors (or cores) of the application circuitry 605 may be coupled with or may include memory/storage elements and may be configured to execute instructions stored in the memory/storage to enable various so applications or operating systems to run on the system 600. In some implementations, the memory/storage elements may be on-chip memory circuitry, which may include any suitable volatile and/or non-volatile memory, such as dynamic random access memory DRAM, SRAM, EPROM, EEPROM, Flash memory, solid-state memory, and/or any other type of memory device technology, such as those discussed herein.

The processor(s) of application circuitry 1705 may include, for example, one or more processor cores, one or more application processors, one or more graphic processing units (GPUs), one or more reduced instruction set computer (RISC) processors, one or more Arm processors, one or more CISC processors, one or more DSPs, one or more FPGAs, one or more PLDs, one or more ASICs, one or more microprocessors or controllers, a multithreaded processor, an ultra-low voltage processor, an embedded processor, some other known processing element, or any suitable combination thereof. In some embodiments, the application circuitry 1705 may comprise, or may be, a special-purpose processor controller to operate according to the various embodiments herein.

As examples, the processor(s) of application circuitry 1705 may include an Intel® Architecture Core™ based processor, such as a Quark™, an Atom™, an i3, an i5, an i7, or an MCU-class processor, or another such processor available from Intel® Corporation, Santa Clara, CA. The processors of the application circuitry 1705 may also be one or more of Advanced Micro Devices (AMD) Ryzen® processor(s) or Accelerated Processing Units (APUs); A5-A9 processor(s) from Apple® Inc., Snapdragon™ processor(s) from Qualcomm® Technologies, Inc., Texas Instrument, Inc.® Open Multimedia Applications Platform (OMAP)™ processor(s); a MIPS-based design from MIPS Technologies, Inc. such as MIPS Warrior M-class, Warrior I-class, and Warrior P-class processors; an Arm-based design licensed from ARM Holdings, Ltd., such as the ARM Cortex-A, Cortex-R, and Cortex-M family of processors; or the like. In some implementations, the application circuitry 1705 may be a part of a system on a chip (SoC) in which the application circuitry 1705 and other components are formed into a single integrated circuit, or a single package, such as the Edison™ or Galileo™ SoC boards from Intel® Corporation.

Additionally or alternatively, application circuity 1705 may include circuitry such as, but not limited to, one or more a field-programmable devices (FPDs) such as PPGAs and the like; PLDs such as complex PLDs (CPLDs), high-capacity PLDs (HCPLDs), and the like; ASICs such as structured ASICs and the like; programmable SoCs (PSoCs); and the like. In such embodiments, the circuitry of application circuitry 1705 may comprise logic blocks or logic fabric, and other interconnected resources that may be programmed to perform various functions, such as the procedures, methods, functions, etc. of the various embodiments discussed herein. In such embodiments, the circuitry of application circuitry 1705 may include memory cells such as EPROM, EEPROM, flash memory, static memory (e.g., SRAM, anti-fuses, etc.)) used to store logic blocks, logic fabric, data, etc. in LUTs and the like.

The baseband circuitry 1710 may be implemented, for example, as a solder-down substrate including one or more integrated circuits, a single packaged integrated circuit soldered to a main circuit board or a multi-chip module containing two or more integrated circuits.

The RFEM 1715, which may also be referred to as "radio front end circuitry," may comprise a mmWave RFEM and one or more sub-mmWave RFCs, in some implementations, the one or more sub-mmWave RFICs may be physically separated from the mmWave RFEM. The RFICs may include connections to one or more antennas or antenna arrays, and the RFEM may be connected to multiple antennas. In alternative implementations, both mmWave and sub-mmWave radio functions may be implemented in the same physical RFEM 1715, which incorporates both mmWave antennas and sub-mmWave.

The memory circuitry 1720 may include any number and type of memory devices used to provide for a given amount of system memory. As examples, the memory circuitry 620 may include one or mom of volatile memory including RAM, DRAM, and/or SDRAM, and NVM including high-speed electrically erasable memory (commonly referred to as Flash memory), PRAM, MRAM, etc. The memory circuitry 1720 may be developed in accordance with a JEDEC LPDDR-based design, such as LPDDR2, LPDDR3, LPDDR4, or the like. Memory circuitry 1720 may be implemented as one or more of solder down packaged integrated circuits, single die package (SDP), DDP or Q17P, socketed memory modules, DIMMs including microDIMMs or MiniDIMMs, and/or soldered onto a motherboard via a ball grid array (BGA). In low power implementations, the memory circuitry 1720 may be on-die memory or registers associated with the application circuitry 1705. To provide for persistent storage of information such as data, applications, operating systems and so forth, memory circuitry 1720 may include one or more mass storage devices, which may include, inter alia, a SSDD, HDD, a micro HDD, resistance change memories, phase change memories, holographic memories, or chemical memories, among others. For example, the computer platform 1700 may incorporate the XPOINT memories from Intel® and Micron®.

Removable memory circuitry 1723 may include devices, circuitry, enclosures/housings, ports or receptacles, etc. used to couple portable data storage devices with the platform 1700. These portable data storage devices may be used for mass storage purposes, and may include, for example, flash memory cards (e.g., SD cards, microSD cards, xD picture cards, and the like), and USB flash drives, optical discs, external HDDs, and the like.

The platform 1700 may also include interface circuitry (not shown) that is used to connect external devices with the platform 1700. The external devices connected to the platform 600 via the interface circuitry include sensor circuitry 1721 and electro-mechanical components (EMCs) 1722, as well as removable memory devices coupled to removable memory circuitry 1723.

The sensor circuitry 1721 include devices, modules, or subsystems whose purpose is to detect events or changes in its environment and send the information (sensor data) about the detected events to some other a device, module, subsystem, etc. Examples of such sensors include, inter alia, inertia measurement units (IMUs) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temperature sensors (e.g., thermistors); pressure sensors; barometric pressure sensors; gravimeters; altimeters; image capture devices (e.g., cameras or lensless apertures); light detection and ranging (LiDAR) sensors; proximity sensors (e.g., infrared radiation detector and the like), depth sensors, ambient light sensors, ultrasonic transceivers: microphones or other like audio capture devices; etc.

EMCs 1722 include devices, modules, or subsystems whose purpose is to enable platform 1700 to change its state, position, and/or orientation, or move or control a mechanism or (sub)system. Additionally, EMCs 1722 may be configured to generate and send messages/signaling to other components of the platform 1700 to indicate a current state of the EMCs 1722. Examples of the EMCs 1722 include one or more power switches, relays including electromechanical relays (EMRs) and/or solid state relays (SSRs), actuators (e.g., valve actuators, etc.), an audible sound generator, a visual warning device, motors (e.g., DC motors, stepper motors, etc.), wheels, thrusters, propellers, claws, clamps, hooks, and/or other like electro-mechanical components. In embodiments, platform 1700 is configured to operate one or more EMCs 1722 based on one or more captured events and/or instructions or control signals received from a service provider and/or various clients.

In some implementations, the interface circuitry may connect the platform 1700 with positioning circuitry 1745. The positioning circuitry 1745 includes circuitry to receive and decode signals transmitted/broadcasted by a positioning network of a GNSS. Examples of navigation satellite constellations (or GNSS) include United States' GPS, Russia's GLONASS, the European Union's Galileo system, China's BeiDou Navigation Satellite System, a regional navigation system or GNSS augmentation system (e.g., NAVIC), Japan's QZSS, France's DORIS, etc.), or the like. The positioning circuitry 1745 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 1745 may include a Micro-PNT IC that uses a master timing clock to perform position tracking/estimation without GNSS assistance. The positioning circuitry 1745 may also be part of, or interact with, the baseband circuitry 1710 and/or RFEMs 1715 to communicate with the nodes and components of the positioning network. The positioning circuitry 1745 may also provide position data and/or time data to the application circuitry 1705, which may use the data to synchronize operations with various infrastructure (e.g., radio base stations), for turn-by-turn navigation applications, or the like.

In some implementations, interface circuitry may connect the platform 1700 with Near-Field Communication (NFC) circuitry 1740. NFC circuitry 1740 is configured to provide contactless, short-mange communications based on radio frequency identification (RFID) standards, wherein magnetic field induction is used to enable communication between NFC circuitry 1740 and NFC-enabled devices external to the platform 1700 (e.g., an "NFC touchpoint"). NFC circuitry 1740 comprises an NFC controller coupled with an antenna element and a processor coupled with the NFC controller. The NFC controller may be a chip/IC providing NFC functionalities to the NFC circuitry 1740 by executing NFC controller firmware and an NFC stack. The NFC stack may be executed by the processor to control the NFC controller, and the NFC controller firmware may be executed by the NFC controller to control the antenna element to emit short-range RF signals. The RF signals may power a passive NFC tag (e.g., a microchip embedded in a sucker or wristband) to transmit stored data to the NFC circuitry 640, or initiate data transfer between the NFC circuitry 640 and another active NFC device (e.g., a smartphone or an NFC-enabled POS terminal) that is proximate to the platform 1700.

The driver circuitry 1746 may include software and hardware elements that operate to control particular devices that are embedded in the platform 1700, attached to the platform 1700, or otherwise communicatively coupled with the platform 1700. The driver circuitry 1746 may include individual drivers allowing other components of the platform 1700 to interact with or control various input/output (I/O) devices that may be present within, or connected to, the platform 1700. For example, driver circuitry 1746 may include a display driver to control and allow access to a display device, a touchscreen driver to control and allow access to a touchscreen interface of the platform 1700, sensor drivers to obtain sensor readings of sensor circuitry 1721 and control and allow access to sensor circuitry 1721, EMC drivers to obtain actuator positions of the EMCs 1722 and/or control and allow access to the EMCs 1722, a camera driver to control and allow access to an embedded image capture device, audio drivers to control and allow access to one or more audio devices.

The PMIC 1725 (also referred to as "power management circuitry 1725") may manage power provided to various components of the platform 1700. In particular, with respect to the baseband circuitry 1710, the PMIC 1725 may control power-source selection, voltage scaling, battery charging, or DC-to-DC conversion. The PMIC 1725 may often be included when the platform 1700 is capable of being powered by a battery 1730, for example, when the device is included in a UE 601.

In some embodiments, the PMIC 1725 may control, or otherwise be part of, various power saving mechanisms of the platform 1700. For example, if the platform 1700 is in an RRC_Connected state, where it is still connected to the RAN node as it expects to receive traffic shortly, then it may enter a state known as DRX after a period of inactivity. During this state, the platform 1700 may power down for brief intervals of time and thus save power. If there is no data traffic activity for an extended period of time, then the platform 1700 may transition off to an RRC_Idle state, where it disconnects from the network and does not perform operations such as channel quality feedback, handover, etc. The platform 1700 goes into a very low power state and it performs paging where again it periodically wakes up to listen to the network and then powers down again. The platform 1700 may not receive data in this state: in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 1730 may power the platform 1700, although in some examples the platform 1700 may be mounted deployed in a fixed location, and may have a power supply coupled to an electrical grid. The battery 1730 may be a lithium ion battery, a metal-air battery, such as a zinc-air battery, an aluminum-air battery, a lithium-air battery, and the like. In some implementations, such as in V2X applications, the battery 1730 may be a typical lead-acid automotive battery.

In some implementations, the battery 1730 may be a "smart battery," which includes or is coupled with a BMS or battery monitoring integrated circuitry. The BMS may be included in the platform 600 to track the state of charge (SoCh) of the battery 1730. The BMS may be used to monitor other parameters of the battery 1730 to provide failure predictions, such as the state of health (SoH) and the state of function (SoF) of the battery 1730. The BMS may communicate the information of the battery 1730 to the application circuitry 1705 or other components of the platform 1700. The BMS may also include an analog-to-digital (ADC) convertor that allows the application circuitry 1705 to directly monitor the voltage of the battery 1730 or the current flow from the battery 1730. The battery parameters may be used to determine actions that the platform 1700 may perform, such as transmission frequency, network operation, sensing frequency, and the like.

A power block, or other power supply coupled to an electrical grid may be coupled with the BMS to charge the battery 1730. In some examples, the power block may be replaced with a wireless power receiver to obtain the power wirelessly, for example, through a loop antenna in the computer platform 1700. In these examples, a wireless battery charging circuit may be included in the BMS. The specific charging circuits chosen may depend on the size of the battery 1730, and thus, the current required. The charging may be performed using the Airfuel standard promulgated by the Airfuel Alliance, the Qi wireless charging standard promulgated by the Wireless Power Consortium, or the Rezence charging standard promulgated by the Alliance for Wireless Power, among others.

User interface circuitry 1750 includes various input/output (I/O) devices present within, or connected to, the platform 1700, and includes one or more user interfaces designed to enable user interaction with the platform 1700 and/or peripheral component interfaces designed to enable peripheral component interaction with the platform 1700. The user interface circuitry 1750 includes input device circuitry and output device circuitry. Input device circuitry includes any physical or virtual means for accepting an input including, inter alia, one or more physical or virtual buttons (e.g., a reset button), a physical keyboard, keypad, mouse, touchpad, touchscreen, microphones, scanner, headset, and/or the like. The output device circuitry includes any physical or virtual means for showing information or otherwise conveying information, such as sensor readings, actuator position(s), or other like information. Output device circuitry may include any number and/or combinations of audio or visual display, including, inter alia, one or more simple visual outputs/indicators (e.g., binary status indicators (e.g., light emitting diodes (LEDs)) and multi-character visual outputs, or more complex outputs such as display devices or touchscreens (e.g., Liquid Chrystal Displays (LCD), LED displays, quantum dot displays, projectors, etc.), with the output of characters, graphics, multimedia objects, and the like being generated or produced from the operation of the platform 1700. The output device circuitry may also include speakers or other audio emitting devices, printer(s), and/or the like. In some embodiments, the sensor circuitry 1721 may be used as the input device circuitry (e.g., an image capture device, motion capture device, or the like) and one or more EMCs may be used as the output device circuitry (e.g., an actuator to provide haptic feedback or the like). In another example, NFC circuitry comprising an NFC controller coupled with an antenna element and a processing device may be included to read electronic tags and/or connect with another NFC-enabled device. Peripheral component interfaces may include, but are not limited to, a non-volatile memory port, a USB port, an audio jack, a power supply interface, etc.

Although not shown, the components of platform 1700 may communicate with one another using a suitable bus or interconnect (IX) technology, which may include any number of technologies, including ISA, EISA, PCI, PCIx, PCIe, a Time-Trigger Protocol (TTP) system, a FlexRay system, or any number of other technologies. The bus/IX may be a proprietary bus/IX, for example, used in a SoC based system. Other bus/IX systems may be included, such as an I2C interface, an SPI interface, point-to-point interfaces, and a power bus, among others.

Figure 18:
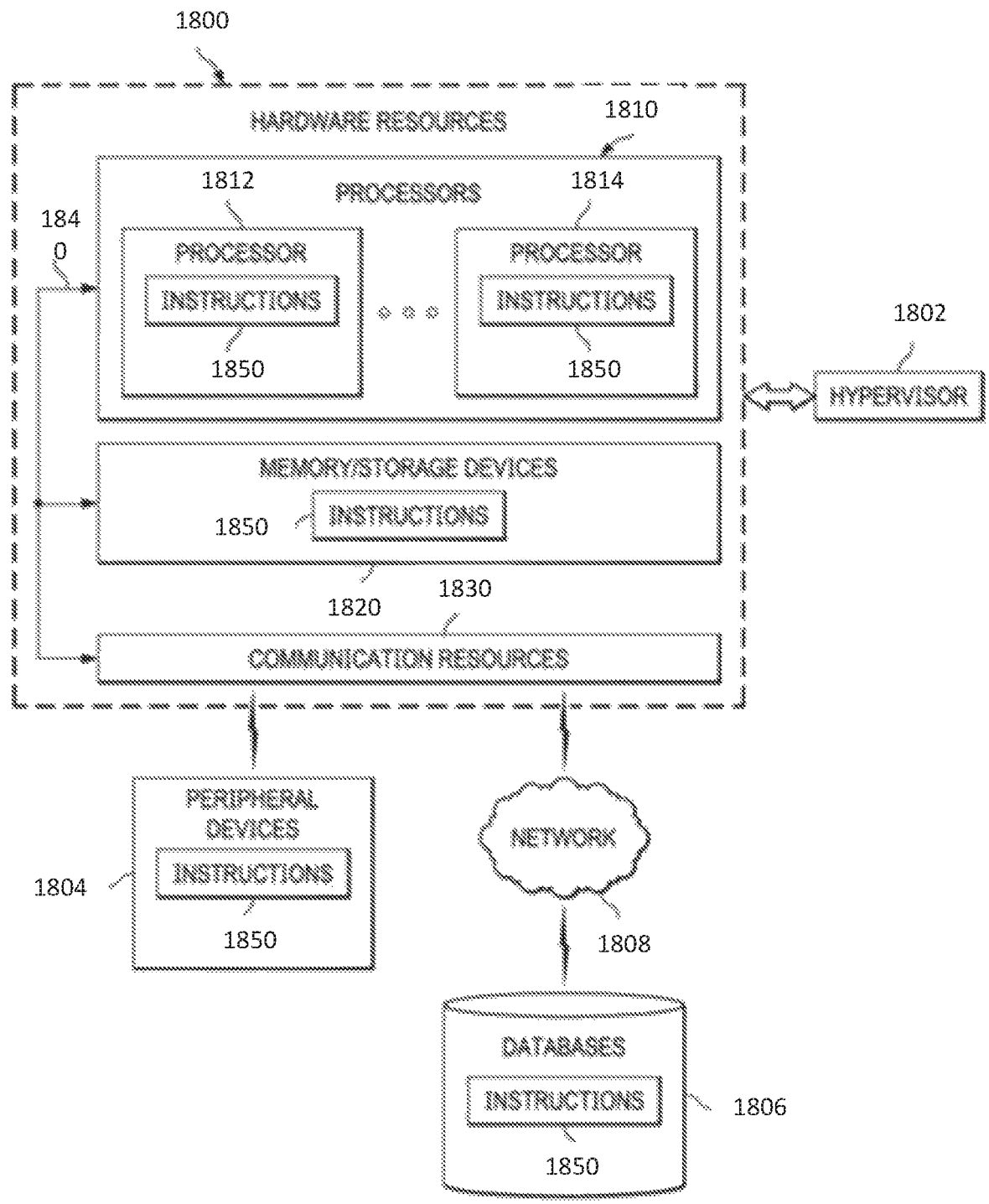
FIG. 18 is a block diagram illustrating components able to read instructions from a machine-readable or computer-readable medium and perform any one or more of the methodologies discussed herein in accordance with some embodiments.

FIG. 18 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 18 shows a diagrammatic representation of hardware resources 1800 including one or more processors (or processor cores) 1810, one or more memory/storage devices 1820, and one or more communication resources 1830, each of which may be communicatively coupled via a bus 1840. For embodiments where node virtualization (e.g., NFV) is utilized, a hypervisor 1802 may be executed to provide an execution environment for one or more network slices/sub-slices to utilize the hardware resources 1800.

The processors 1810 may include, for example, a processor 1812 and a processor 1814. The processor(s) 1810 may be, for example, a CPU, a RISC processor, a CISC processor, a GPU, a DSP such as a baseband processor, an ASIC, an FPGA, a RFIC, another processor (including those discussed herein), or any suitable combination thereof.

The memory/storage devices 1820 may include main memory, disk storage, or any suitable combination thereof. The memory/storage devices 1820 may include, but are not limited to, any type of volatile or nonvolatile memory such as DRAM, SRAM, EPROM, EEPROM, Flash memory, solid-state storage, etc.

The communication resources 1830 may include interconnection or network interface components or other suitable devices to communicate with one or more peripheral devices 1804 or one or more databases 1806 via a network 1808. For example, the communication resources 1830 may include wired communication components (e.g., for coupling via USB), cellular communication components, NFC components, Bluetooth® (or Bluetooth® Low Energy) components, Wi-Fi® components, and other communication components.

Instructions 1850 may comprise software, a program, an application, an applet, an app, or other executable code for causing at least any of the processors 1810 to perform any one or more of the methodologies discussed herein. The instructions 1850 may reside, completely or partially, within at least one of the processors 1810 (e.g., within the processor's cache memory), the memory/storage devices 1820, or any suitable combination thereof. Furthermore, any portion of the instructions 1850 may be transferred to the hardware resources 1800 from any combination of the peripheral devices 1804 or the databases 1806. Accordingly, the memory of processors 1810, the memory-storage devices 1820, the peripheral devices 1804, and the databases 1806 are examples of computer-readable and machine-readable media.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

In the following sections, further exemplary embodiments are provided.

Example 1 includes a method of operating a UE, the method comprises: processing one or more configuration messages from a gNB to determine a configured grant "CG" periodicity and a bitmap that is to indicate a plurality of time-domain resources of an unlicensed spectrum that are available for CG uplink transmissions to the gNB; and encoding, based on the CG periodicity and the bitmap, a CG uplink transmission to be transmitted to the gNB in one or more time-domain resources of the plurality of time-domain resources.

Example 2 includes the method of example 1 or some other example herein, further comprising determining availability of time-domain resources for CG uplink transmissions based on all values of the bitmap repeated over time independent of the CG periodicity.

Example 3 includes the method of example 1 or some other example herein, wherein the CG periodicity defines resource allocation periods "RAPs" with a first length in time resource units, the bitmap includes a second length in the time resource units that is larger than the first length, and the method further comprises: determining availability of time-domain resources for CG uplink transmissions based on a first number of values of the bitmap for each of the RAPs, wherein the first number corresponds to the first length.

Example 4 includes the method of example 1 or some other example herein, wherein the CG periodicity defines resource allocation periods "RAPs" to include a first length "P" in time resource units, the bitmap includes a second length "X" in the time resource units that is larger than the first length, and the method further comprises: determining availability of time-domain resources for CG uplink transmissions for a plurality "n" of consecutive RAPs based on all values of the bitmap, wherein n×P=X or (n×P>X and (n−1)× P<X).

Example 5 includes the method of example 4 or some other example herein, wherein, if (n×P>X and (n−1)×P<X) the method includes: determining availability of a first number of time resource units in a last RAP of the plurality of consecutive RAPs based on a corresponding number of values at an end of the bitmap; and determining availability of a second number of time resource units in the last RAP based on a corresponding number of values at a beginning of the bitmap.

Example 6 includes the method of example 1 or some other example herein, wherein the CG periodicity includes a first length in time resource units, the bitmap includes a second length in the time resource units that is smaller than the first length, and the method further comprises: determining availability of a first number of time-domain resources for CG uplink transmissions in a first period based on all values of the bitmap; and determining availability of a second number of time-domain resources for CG uplink transmissions at an end of the first period based on one or more values at a beginning of the bitmap.

Example 7 includes the method of example 1 or some other example herein, wherein the CG periodicity includes a first length in time resource units, the bitmap includes a second length in the time resource units that is smaller than the first length, and the method further comprises: determining availability of a first number of time-domain resources for CG uplink transmissions in a first period based on all values of the bitmap; and discarding a second number of time-domain resources for CG uplink transmissions at an end of the first period.

Example 8 includes the method of example 1 or some other example herein, wherein the CG periodicity includes a first length in time resource units, the bitmap includes a second length in the time resource units that is smaller than the first length, and the method further comprises: determining availability of a first number of time-domain resources for CG uplink transmissions in a first period based on all values of the bitmap; and discarding a second number of time-domain resources for CG uplink transmissions at an end of the first period.

Example 9 includes the method of example 1 or some other example herein, wherein the CG periodicity includes a first length in time resource units, the bitmap includes a second length in the time resource units that is smaller than the first length, and the method further comprises: determining availability of a plurality of resource allocations of the time-domain resources for CG uplink transmissions based on a corresponding plurality of iterations of the bitmap.

Example 10 includes the method of example 9 or some other example herein, wherein the plurality of iterations are circular-shifted versions of the bitmap based on a corresponding plurality of offsets.

Example 11 includes the method of example 1 or some other example herein, further comprising: receiving an index in radio resource control signal or downlink control information; and accessing a bitmap allocation configuration table based on the index to determine the bitmap.

Example 12 includes a method of operating a gNB, the method comprising: identifying bitmap information that includes information corresponding to a bitmap that indicates whether time-domain resources of an unlicensed spectrum are available for configured grant uplink transmissions from a user equipment (UE) to the gNB; encoding the bitmap information in a radio resource control (RRC) message; and transmitting the bitmap information to the UE.

Example 13 includes the method of example 12 or some other example herein, wherein the bitmap information is to configure the UE with a bitmap configuration table that includes one or more bitmaps, cyclic shifts, or granularities to configure the time-domain resources for configured grant uplink transmissions.

Example 14 includes the method of example 13 or some other example herein, further comprising: encoding an index to the bitmap configuration table in RRC signaling or downlink control information; and transmitting the index to the UE.

Example 15 includes the method of example 12 or some other example herein, wherein the bitmap information includes information corresponding to a plurality of bitmaps and the method further comprises: processing configured grant uplink control information to determine a first bitmap selected by the UE from the plurality of bitmaps that is to be used by the UE to determined time-domain resources available for configured grant uplink transmissions.

Example 16 includes a method of performing a configured grant transmission at a user equipment, "UE," the method comprising: receiving, in one or more configuration so messages, slot-offset configuration information to configure a plurality of slot offsets within a configured grant periodicity and duration information to indicate a number of consecutive resources that are allocated for configured grant after individual slot offsets of the plurality of slot offsets; and selecting uplink resources based on the slot-offset configuration information and the duration information; and encoding a configured grant uplink transmission using the selected uplink resources.

Example 17 includes the method of example 16 or some other example herein, wherein the slot-offset configuration information is to provide a first sequence or bitmap to configure the plurality of slot offsets and the duration information is to provide a second sequence or bitmap to configure duration values that indicate consecutive number of resources that are allocated for configured grant after corresponding slot offsets of the plurality of slot offsets.

Example 18 includes the method of example 16 or some other example herein, wherein if configured grant type 1 is used, the plurality of slot offsets am with respect to a system frame number; and, if configured grant type 2 is used, the plurality of slot offsets are with respect to an activation downlink control information.

Example 19 includes the method of example 16 or some other example herein, further comprising: determining a value and granularity of duration information based on radio resource control signaling.

Example 20 includes the method of example 16 or some other example herein, wherein the slot-offset configuration information and duration information is to configure a plurality of sets of resources and the method further comprises: determining one or more sets of resources of the plurality of sets of resources allocated for configured grant based on downlink control information.

Example 21 includes the method of example 16 or some other example herein, further comprising: performing a listen-before-talk, "LBT," operation before the selected uplink resources; and transmitting the configured grant uplink transmission based on said performing of the LBT operation.

Example 22 includes the method of example 16 or some other example herein, wherein the slot offset configuration information is to include a total number of configured slot offsets, "n," and the method further comprises: determining slot offset locations based on the total number of configured slot offsets, a legacy offset indication, "K2," a periodicity, "P," and the duration information, "z."

Example 23 includes the method of example 22 or some other example herein, further comprising: determining a gap value, "g," to be added to end of a transmission duration based on $g=[(P-n(K\_2+z)/n]$.

Example 24 includes the method of example 16 or some other example herein, wherein the slot-offset configuration information is to configure a bitmap to enable or disable resource allocations having the number of consecutive resources and the method further comprises: selecting the uplink resources based on the bitmap.

Example 25 includes the method of example 16 or some other example herein, wherein said receiving the slot-offset configuration information and the duration information comprises receiving, in RRC signaling, indications of a first plurality of slot offset values and a second plurality of duration values.

Example 26 includes the method of example 25 or some other example herein, wherein the method further comprises: receiving, in downlink control information, an indication of one or more slot offset values from the first plurality of slot offset values and an indication of one or more duration values from the second plurality of duration values.

Example 27 includes the method of example 25 or some other example herein, wherein the indications of the first plurality of slot offset values and the second plurality of duration values in the RRC signaling is to configure a lookup table having groups of the slot offset values and duration values; and the indication of the one or more slot offset values and the indication of the one or more duration values in the downlink control information comprise one or more pointers to the lookup table.

Example 28 includes the method of example 25 or some other example herein, wherein the method further comprises: autonomously selecting, based on a traffic condition at the UE, one or more slot offset values from the first plurality of slot offset values and one or more duration values from the second plurality of duration values.

Example 29 includes a method of performing a configured grant transmission at a user equipment, "UE," the method comprising: receiving an indication of a starting and length value, "SLIV," that is to identify an initial mini-slot in a configured grant periodicity; determining, based on configuration information, one or more additional mini-slots in the configured grant periodicity; and encoding a configured grant uplink transmission on at least one mini-slot selected from the initial mini-slot or the one or more additional mini-slots.

Example 30 includes the method of example 29 or some other example herein, further comprising: receiving an indication of a duration parameter; and determining the one or more additional mini-slots based on the indication of the duration parameter.

Example 31 includes the method of example 29 or some other example herein, further comprising: selecting the at least one mini-slot based on traffic demand of the UE.

Example 32 includes the method of example 29 or some other example herein, wherein the one or more additional mini-slots have length values less than a length value of the initial mini-slot.

Example 33 includes the method of example 29 or some other example herein, wherein a first mini-slot of the at least one mini-slot has a time allocation that spans a slot boundary between a first slot and a second slot and the method further comprises: transmitting a first portion of a configured grant physical uplink shared channel, "PUSCH," in a first derived mini-slot in the first slot and a second portion of the configured grant PUSCH in a second derived mini-slot in the second slot.

Example 34 includes the method of example 33 or some other example herein, wherein a combined length of the first and the second derived mini-slots is equal to or greater than a length of the first mini-slot.

Example 35 includes the method of example 33 or some other example herein, wherein a length of the first derived mini-slot is less than a length of the first mini-slot and a length of the second derived mini-slot is equal to the length of the first mini-slot.

Example 36 includes the method of example 33 or some other example herein, further comprising transmitting the first and second portions of the configure grant PUSCH with same redundancy version identifiers.

Example 37 includes the method of example 29 or some other example herein, further comprising: receiving an indication of a repetition parameter; and encoding the configured grant uplink transmission to include one or more repetitions of a transport block based on the repetition parameter.

Example 38 includes the method of example 29 or some other example herein, further comprising: encoding uplink control information to indicate an ending symbol of a final physical uplink shared channel, "PUSCH," transmission for a period.

Example 39 includes the method of example 38 or some other example herein, further comprising: determining a listen-before-talk, "LBT," gap for another UE; and puncturing a portion of the final PUSCH transmission that corresponds to the LBT gap.

Example 40 may include an apparatus comprising means to perform one or more elements of a method described in or related to any of examples 1-39, or any other method or process described herein.

Example 41 may include one or more non-transitory computer-readable media comprising instructions to cause an electronic device, upon execution of the instructions by one or more processors of the electronic device, to perform one or more elements of a method described in or related to any of examples 1-39, or any other method or process described herein.

Example 42 may include an apparatus comprising logic, modules, or circuitry to perform one or more elements of a method described in or related to any of examples 1-39, or any other method or process described herein.

Example 43 may include a method, technique, or process as described in or related s to any of examples 1-39, or portions or parts thereof.

Example 44 may include an apparatus comprising: one or more processors and one or more computer-readable media comprising instructions that, when executed by the one or more processors, cause the one or more processors to perform the method, techniques, or process as described in or related to any of examples 1-39, or portions thereof.

Example 45 may include a signal as described in or related to any of examples 1-39, or portions or parts thereof.

Example 46 may include a datagram, information element, packet, frame, segment, PDU, or message as described in or related to any of examples 1-39, or portions or parts thereof, or otherwise described in the present disclosure.

Example 47 may include a signal encoded with data as described in or related to any of examples 1-39, or portions or parts thereof, or otherwise described in the present disclosure.

Example 48 may include a signal encoded with a datagram, IE, packet, frame, segment, PDU, or message as described in or related to any of examples 1-64, or portions or parts thereof, or otherwise described in the present disclosure.

Example 49 may include an electromagnetic signal carrying computer-readable instructions, wherein execution of the computer-readable instructions by one or more processors is to cause the one or more processors to perform the method, techniques, or process as described in or related to any of examples 1-39, or portions thereof.

Example 50 may include a computer program comprising instructions, wherein execution of the program by a processing element is to cause the processing element to carry out the method, techniques, or process as described in or related to any of examples 1-39, or portions thereof.

Example 51 may include a signal in a wireless network as shown and described herein.

Example 52 may include a method of communicating in a wireless network as shown and described herein.

Example 53 may include a system for providing wireless communication as shown and described herein.

Example 54 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. One or more non-transitory, computer-readable storage-media having instructions that, when executed, cause processing circuitry to:
   process one or more configuration messages from a base station to determine a configured grant (CG) periodicity and a bitmap that is to indicate a plurality of time-domain resources of an unlicensed spectrum that are available for CG uplink transmissions to the base station, wherein the CG periodicity defines a resource allocation period (RAP) with a first length in time resource units and the bitmap includes a second length in the time resource units that is smaller than the first length;
   determine availability of a first number of consecutive time-domain resources for CG uplink transmissions in a first part of the RAP based on a respective first number of values of the bitmap, wherein the first number of values of the bitmap include all values of the bitmap; and
   encode, based on the CG periodicity and the bitmap, a CG uplink transmission to be transmitted to the base station in one or more time-domain resources of the first number of consecutive time-domain resources.

2. The one or more non-transitory, computer-readable storage-media of claim 1, wherein the instructions, when executed, further cause the processing circuitry to: determine availability of time-domain resources for CG uplink transmissions based on all values of the bitmap repeated over time independent of the CG periodicity.

3. The one or more non-transitory, computer-readable storage-media of claim 1, wherein the instructions, when executed, further cause the processing circuitry to:
   determine availability of a second number of time-domain resources for CG uplink transmissions in a second part of the RAP based on one or more values at a beginning of the bitmap; and
   further encode the CG uplink transmission in at least one time-domain resource of the second number of time-domain resources.

4. The one or more non-transitory, computer-readable storage-media of claim 1, wherein the instructions, when executed, further cause the processing circuitry to:
   discard a second number of time-domain resources for CG uplink transmissions in a second part of the RAP.

5. The one or more non-transitory, computer-readable storage-media of claim 1, wherein the instructions, when executed, further cause the processing circuitry to:
   determine availability of a first plurality of RAPs of the time-domain resources for CG uplink transmissions based on a second plurality of iterations of the bitmap.

6. The one or more non-transitory, computer-readable storage-media of claim 5, wherein the second plurality of iterations are circular-shifted versions of the bitmap based on a corresponding plurality of offsets.

7. The one or more non-transitory, computer-readable storage-media of claim 1, wherein the instructions, when executed, further cause the processing circuitry to:
   receive an index in radio resource control signal or downlink control information; and
   access a bitmap allocation configuration table based on the index to determine the bitmap.

8. An apparatus comprising:
   protocol processing circuitry to:
      identify bitmap information that includes information corresponding to a bitmap having a plurality of values that indicates whether a corresponding plurality of consecutive time-domain resources of an unlicensed spectrum are available for configured grant uplink transmissions from a user equipment (UE) to a base station, wherein the bitmap information is to configure the UE with a bitmap configuration table that includes one or more cyclic shifts to configure the plurality of consecutive time-domain resources for configured grant uplink transmissions;

encode the bitmap information in a radio resource control (RRC) message; and encode an index to the bitmap configuration table in RRC signaling or downlink control information; and interface circuitry, coupled with the protocol processing circuitry, to enable communication.

9. The apparatus of claim 8, wherein the bitmap configuration table further includes one or more bitmaps or granularities.

10. The apparatus of claim 8, wherein the bitmap information includes information corresponding to a plurality of bitmaps and the protocol processing circuitry is further to: process configured grant uplink control information to determine a first bitmap selected by the UE from the plurality of bitmaps that is to be used by the UE to determine time-domain resources available for configured grant uplink transmissions.

11. A method comprising:

processing one or more configuration messages from a base station to determine a configured grant (CG) periodicity and a bitmap that is to indicate a plurality of time-domain resources of an unlicensed spectrum that are available for CG uplink transmissions to the base station, wherein the CG periodicity defines a resource allocation period (RAP) with a first length in time resource units and the bitmap includes a second length in the time resource units that is smaller than the first length;

determining availability of a first number of consecutive time-domain resources for CG uplink transmissions in a first part of the RAP based on a respective first number of values of the bitmap, wherein the first number of values of the bitmap include all values of the bitmap; and encoding, based on the CG periodicity and the bitmap, a CG uplink transmission to be transmitted to the base station in one or more time-domain resources of the first number of consecutive time-domain resources.

12. The method of claim 11, further comprising:

determining availability of time-domain resources for CG uplink transmissions based on all values of the bitmap repeated over time independent of the CG periodicity.

13. The method of claim 12, further comprising:

determining availability of a second number of time-domain resources for CG uplink transmissions in a second part of the RAP based on one or more values at a beginning of the bitmap; and further encoding the CG uplink transmission in at least one time-domain resource of the second number of time-domain resources.

14. The method of claim 12, further comprising:

discarding a second number of time-domain resources for CG uplink transmissions in a second part of the RAP.

15. The method of claim 12, further comprising:

determining availability of a first plurality of RAPs of the time-domain resources for CG uplink transmissions based on a second plurality of iterations of the bitmap.

* * * * *